(12) United States Patent
Lee et al.

(10) Patent No.: US 11,168,237 B2
(45) Date of Patent: Nov. 9, 2021

(54) ADHESION PROMOTERS FOR CURABLE COMPOSITIONS

(71) Applicant: 3M INNOVATIVE PROPERTIES COMPANY, St. Paul, MN (US)

(72) Inventors: Hae-Seung H. Lee, Woodbury, MN (US); Jay S. Schlechte, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/250,156

(22) PCT Filed: Jun. 12, 2019

(86) PCT No.: PCT/IB2019/054915
§ 371 (c)(1),
(2) Date: Dec. 7, 2020

(87) PCT Pub. No.: WO2019/239346
PCT Pub. Date: Dec. 19, 2019

(65) Prior Publication Data
US 2021/0238461 A1 Aug. 5, 2021

Related U.S. Application Data

(60) Provisional application No. 62/684,849, filed on Jun. 14, 2018.

(51) Int. Cl.
| | |
|---|---|
| *B32B 27/38* | (2006.01) |
| *B32B 27/18* | (2006.01) |
| *C09J 163/00* | (2006.01) |
| *C08G 59/14* | (2006.01) |
| *C08G 59/50* | (2006.01) |
| *C07D 303/02* | (2006.01) |
| *C07F 7/08* | (2006.01) |
| *C07F 7/18* | (2006.01) |
| *C08K 5/5445* | (2006.01) |
| *C08G 18/10* | (2006.01) |
| *C08G 18/28* | (2006.01) |
| *C08G 18/38* | (2006.01) |
| *C08G 18/71* | (2006.01) |
| *C08G 59/32* | (2006.01) |
| *C08G 59/40* | (2006.01) |
| *C08K 5/5465* | (2006.01) |
| *C08K 7/20* | (2006.01) |

(52) U.S. Cl.
CPC ............ *C09J 163/00* (2013.01); *C08G 18/10* (2013.01); *C08G 18/2845* (2013.01); *C08G 18/3893* (2013.01); *C08G 18/718* (2013.01); *C08G 59/3227* (2013.01); *C08G 59/3281* (2013.01); *C08G 59/4014* (2013.01); *C08K 5/5445* (2021.01); *C08K 5/5465* (2013.01); *C08K 7/20* (2013.01); *C08G 2170/00* (2013.01); *C09J 2301/30* (2020.08)

(58) Field of Classification Search
CPC ............ C08G 59/1433; C08G 59/1438; C08G 59/1477; C08G 59/1494; C08G 59/50; C07F 7/08; C07F 7/0803; C07F 7/081; C07F 7/0812; C07F 7/18; C07D 303/02; C08L 63/00; C09D 163/00; C09J 163/00; B32B 27/38
USPC .................................. 523/428; 428/413, 414
See application file for complete search history.

(56) References Cited

U.S. PATENT DOCUMENTS

| | | |
|---|---|---|
| 1,910,444 A | 5/1933 | Nicholson |
| 2,705,223 A | 3/1955 | Renfrew |
| 3,041,156 A | 6/1962 | Rowse |
| 3,496,250 A | 2/1970 | Czerwinski |
| 4,314,827 A | 2/1982 | Leitheiser |
| 4,623,364 A | 11/1986 | Cottringer |
| 4,652,275 A | 3/1987 | Bloecher |
| 4,744,802 A | 5/1988 | Schwabel |
| 4,770,671 A | 9/1988 | Monroe |
| 4,799,939 A | 1/1989 | Bloecher |
| 4,881,951 A | 11/1989 | Wood |
| 4,948,449 A | 8/1990 | Tarbutton |
| 4,997,461 A | 3/1991 | Markhoff-Matheny |
| 5,009,675 A | 4/1991 | Kunz |
| 5,011,508 A | 4/1991 | Wald |
| 5,019,607 A * | 5/1991 | Coltrain ................. C08G 18/58 523/435 |

(Continued)

FOREIGN PATENT DOCUMENTS

| | | |
|---|---|---|
| CN | 105504787 A | 4/2016 |
| EP | 1418021 | 5/2004 |

(Continued)

OTHER PUBLICATIONS

International Search Report for PCT International Application No. PCT/IB2019/054915, dated Oct. 29, 2019, 4 pages.
International Search Report for PCT International Application No. PCT/IB2019/054741, dated Oct. 10, 2019, 4 pages.
Riew, "Rubbery-Modified Thermoset Resins", Advances in Chemistry Series No. 208, American Chemical Society, Washington, 1984, 8 pages.

*Primary Examiner* — Michael J Feely
(74) *Attorney, Agent, or Firm* — Jean A. Lown

(57) ABSTRACT

Adhesion promoters, Curable compositions containing the adhesion promoters, cured compositions that are formed from the curable compositions, and articles containing the cured compositions are provided. The adhesion promoter has at least one epoxide group and a plurality of hydrolyzable silyl groups. The curable compositions include an adhesion promoter, an epoxy resin, and a curing agent for the epoxy resin that has at least two amino groups that are primary and/or secondary amino groups.

13 Claims, 1 Drawing Sheet

(56) References Cited

U.S. PATENT DOCUMENTS

| | | |
|---|---|---|
| 5,042,991 A | 8/1991 | Kunz |
| 5,085,671 A | 2/1992 | Martin |
| 5,152,917 A | 10/1992 | Pieper |
| 5,164,348 A | 11/1992 | Wood |
| 5,213,591 A | 5/1993 | Celikkaya |
| 5,352,254 A | 10/1994 | Celikkaya |
| 5,435,816 A | 7/1995 | Spurgeon |
| 5,551,963 A | 9/1996 | Larmie |
| 5,629,380 A | 5/1997 | Baldwin |
| 5,645,619 A | 7/1997 | Erickson |
| 5,672,097 A | 9/1997 | Hoopman |
| 5,946,991 A | 9/1999 | Hoopman |
| 5,975,987 A | 11/1999 | Hoopman |
| 6,008,313 A | 12/1999 | Walker |
| 6,129,540 A | 10/2000 | Hoopman |
| 6,277,161 B1 | 8/2001 | Castro |
| 7,229,683 B2 | 6/2007 | Fischer |
| 7,744,991 B2 | 6/2010 | Fischer |
| 8,142,531 B2 | 3/2012 | Adefris |
| 8,476,334 B2 | 7/2013 | Illsley |
| 2002/0026752 A1 | 3/2002 | Culler |
| 2007/0027233 A1 | 2/2007 | Yamaguchi |
| 2009/0165394 A1 | 7/2009 | Culler |
| 2009/0169816 A1 | 7/2009 | Erickson |
| 2011/0126980 A1 | 6/2011 | Campbell |
| 2013/0037213 A1 | 2/2013 | Frick |
| 2013/0225725 A1 | 8/2013 | Campbell |
| 2015/0051316 A1* | 2/2015 | Chun .................. C07D 303/28 523/425 |
| 2016/0200075 A1 | 7/2016 | Dietze |
| 2017/0335070 A1 | 11/2017 | Erdodi |
| 2018/0030319 A1 | 2/2018 | Chen |

FOREIGN PATENT DOCUMENTS

| | | |
|---|---|---|
| EP | 1584657 | 10/2005 |
| EP | 2223966 | 8/2017 |
| WO | WO 1991-015550 | 10/1991 |
| WO | WO 2007/050538 | 5/2007 |
| WO | WO 2016-105997 | 6/2016 |
| WO | WO 2017-062482 | 4/2017 |
| WO | WO 2017-189388 | 11/2017 |
| WO | WO 2017-192426 | 11/2017 |
| WO | WO 2019-099603 | 5/2019 |
| WO | WO 2019-239267 | 12/2019 |

* cited by examiner

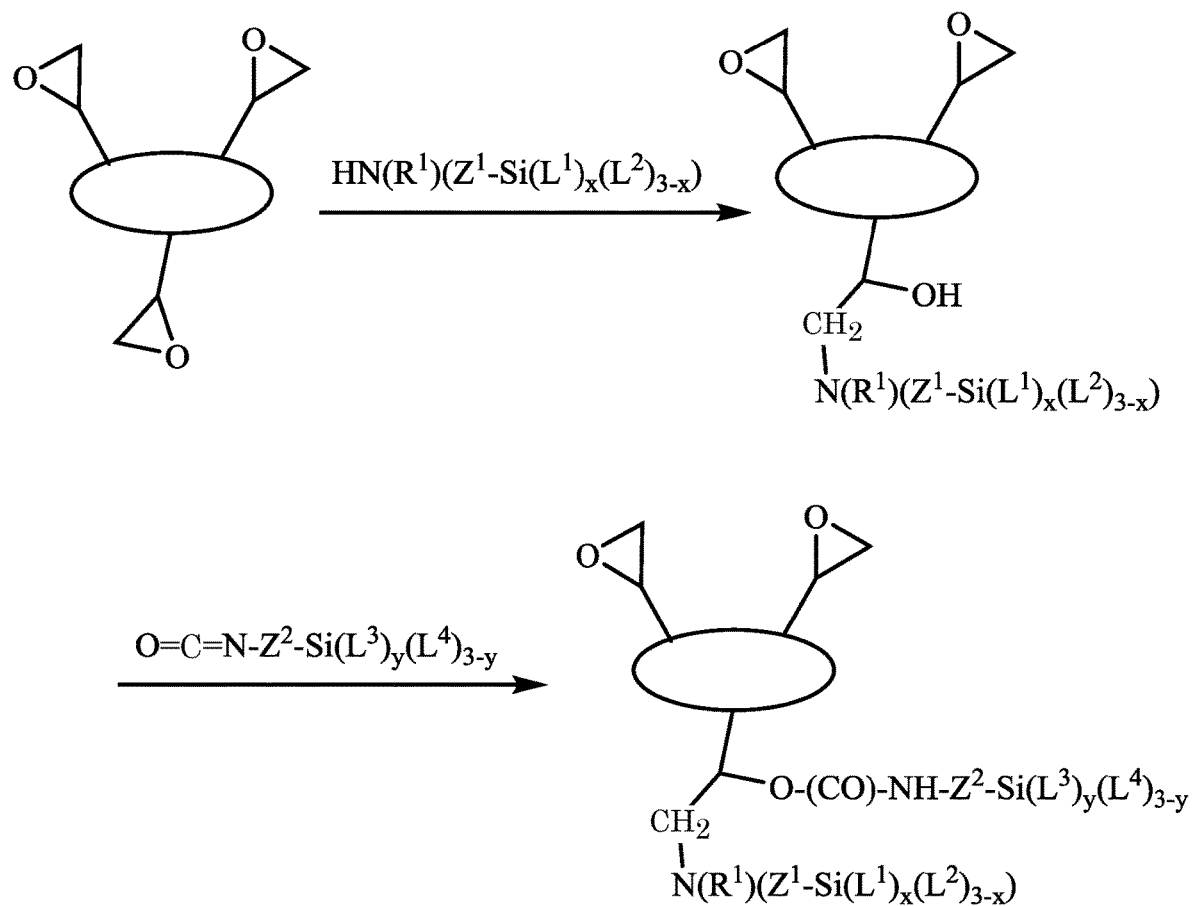

ADHESION PROMOTERS FOR CURABLE COMPOSITIONS

CROSS REFERENCE TO RELATED APPLICATIONS

This application is a national stage filing under 35 U.S.C. 371 of PCT/IB2019/054915, filed Jun. 12, 2019, which claims the benefit of U.S. Provisional Patent Application No. 62/684,849, filed Jun. 14, 2018, the disclosure of which is incorporated by reference herein in its entirety.

BACKGROUND

Structural adhesives are compositions that can bond materials with a mechanical strength that can be comparable to mechanical fasteners. Structural adhesives can be used, for example, to replace or to augment conventional joining techniques such as welding or mechanical fasteners such as nuts, bolts, screws, and rivets. Advantageously, structural adhesives often weigh less than mechanical fasteners. The use of structural adhesives within the transportation industry is increasing.

Adhesion promoters have been used to facilitate adhesion of the structural adhesive to a substrate. For example, known adhesion promotors include 3-glycidylpropyltriethoxysilane and 3-glycidylpropyltrimethoxysilane as used in U.S. Patent Application Publication 2011/0126980 (Campbell et al.).

There is an ongoing interest in increasing the strength of structural adhesives.

SUMMARY

An adhesion promoter, a curable composition containing the adhesion promoter, a cured composition formed from the curable composition, and an article containing the cured composition are provided. The adhesion promoter has at least one epoxide group and a plurality of hydrolyzable silyl groups. The epoxide groups allow incorporation of the adhesion promoter into the polymeric matrix of the cured composition and the silyl groups of the adhesion promoter allow bond formation to various substrates.

In a first aspect, an adhesion promoter is provided. The adhesion promoter has at least one epoxide group and a plurality of hydrolyzable silyl groups. The adhesion promoter is a ring-opened adduct (i.e., reaction product) of 1) a polyepoxide comprising at least two epoxide groups, 2) an aminosilane, and 3) an isocyanato silane. The aminosilane is of Formula (I).

$$HN(R^1)(Z^1-Si(L^1)_x(L^2)_{3-x}) \tag{I}$$

In Formula (I), group $R^1$ is hydrogen, alkyl, or a group of formula $-Z^1-Si(L^1)_x(L^2)_{3-x}$. Group $L^1$ is a hydrolyzable group and $L^2$ is an alkyl. The variable x is an integer equal to 1, 2, or 3. Group $Z^1$ is a divalent linking group having 1 to 12 carbon atoms. The isocyanato silane is of Formula (II).

$$O=C=N-Z^2-Si(L^3)_y(L^4)_{3-y} \tag{II}$$

In Formula (II), $L^3$ is a hydrolyzable group and $L^4$ is an alkyl. The variable y is an integer equal to 1, 2, or 3. Group $Z^2$ is a divalent linking group having 1 to 12 carbon atoms.

In a second aspect, a curable composition is provided. The curable composition contains a curable component comprising a) an adhesion promoter having at least one epoxide group and a plurality of hydrolyzable silyl groups, b) an epoxy resin having at least two epoxide groups, and c) a curing agent for the epoxy resin, the curing agent having at least two amino groups that are primary and/or secondary amino groups. The adhesion promoter is a ring-opened adduct of 1) a polyepoxide comprising at least two epoxide groups, 2) an aminosilane, and 3) an isocyanato silane. The aminosilane is of Formula (I).

$$HN(R^1)(Z^1-Si(L^1)_x(L^2)_{3-x}) \tag{I}$$

In Formula (I), group $R^1$ is hydrogen, alkyl, or a group of formula $-Z^1-Si(L^1)_x(L^2)_{3-x}$. Group $L^1$ is a hydrolyzable group and $L^2$ is an alkyl. The variable x is an integer equal to 1, 2, or 3. Group $Z^1$ is a divalent linking group having 1 to 12 carbon atoms. The isocyanato silane is of Formula (II).

$$O=C=N-Z^2-Si(L^3)_y(L^4)_{3-y} \tag{II}$$

In Formula (II), $L^3$ is a hydrolyzable group and $L^4$ is an alkyl. The variable y is an integer equal to 1, 2, or 3. Group $Z^2$ is a divalent linking group having 1 to 12 carbon atoms.

In a third aspect, a cured composition is provided. The cured composition comprises a cured reaction product of the curable composition described in the second aspect.

In a fourth aspect, an article is provided that comprises a first substrate and a cured composition positioned adjacent to the first substrate. The cured composition is the same as described in the third aspect. In some embodiments, the article further comprises a second substrate and the cured composition is positioned between the first substrate and the second substrate. The cured composition bonds the first substrate to the second substrate.

In a fifth aspect, a dispenser is provided that comprises a first chamber and a second chamber. The first chamber comprises a curing agent for the epoxy resin, wherein the curing agent has at least two amino groups that are primary and/or secondary amino groups. The second chamber comprises an epoxy resin and an adhesion promoter having at least one epoxide group and a plurality of silyl groups. The adhesion promoter is a ring-opened adduct of 1) a polyepoxide comprising at least two epoxide groups, 2) an aminosilane, and 3) an isocyanato silane. The aminosilane is of Formula (I).

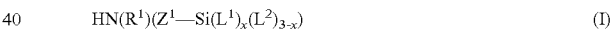
$$HN(R^1)(Z^1-Si(L^1)_x(L^2)_{3-x}) \tag{I}$$

In Formula (I), group $R^1$ is hydrogen, alkyl, or a group of formula $-Z^1-Si(L^1)_x(L^2)_{3-x}$. Group $L^1$ is a hydrolyzable group and $L^2$ is an alkyl. The variable x is an integer equal to 1, 2, or 3. Group $Z^1$ is a divalent linking group having 1 to 12 carbon atoms. The isocyanato silane if of Formula (II).

$$O=C=N-Z^2-Si(L^3)_y(L^4)_{3-y} \tag{II}$$

In Formula (II), $L^3$ is a hydrolyzable group and $L^4$ is an alkyl. The variable y is an integer equal to 1, 2, or 3. Group $Z^2$ is a divalent linking group having 1 to 12 carbon atoms.

BRIEF DESCRIPTION OF THE DRAWING

FIG. 1 is a schematic reaction scheme for formation of the adhesion promoter.

DETAILED DESCRIPTION

An adhesion promoter, a curable composition containing the adhesion promoter, a cured composition formed from the curable composition, and an article containing the cured composition are provided. The adhesion promoter has at least one epoxide group and a plurality of hydrolyzable silyl groups. The epoxide groups allow incorporation of the adhesion promoter into a polymeric matrix that is formed by reacting an epoxy resin with a curing agent having at least two amino groups that are primary and/or secondary amino groups. The hydrolyzable silyl groups of the adhesion promoter allow bond formation with a substrate having groups on its surface that can react with the hydrolyzable silyl groups. That is, the adhesion promoter can be attached by covalent bonds to both the cured polymeric matrix and the substrate.

As used herein, the terms "a", "an", and "the" encompass embodiments having plural referents, unless the context clearly dictates otherwise.

The term "or" is generally employed in its sense including "and/or" unless the context clearly dictates otherwise. The term "and/or" such as A and/or B means A alone, B alone, or both A and B.

The term "aliphatic" refers to a non-aromatic group or compound. The aliphatic group or compound can be a hydrocarbon or can include heteroatoms such as oxygen, nitrogen, and sulfur.

In some instances, the aliphatic group can have 1 to 40 carbon atoms or 1 to 30 carbon atoms. The aliphatic group or compound can be saturated or unsaturated (but not aromatic).

The term "cycloaliphatic" refers to cyclic aliphatic compound or group or to an aliphatic group or compound having a portion that is cyclic. In some instances, the cycloaliphatic group or compound has 3 to 40 carbon atoms or 3 to 30 carbon atoms.

The term "alkyl" refers to a monovalent group that is a radical of an alkane and includes groups that are linear, branched, cyclic, bicyclic, or a combination thereof. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Example alkyl groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a di-radical of an alkane and includes groups that are linear, branched, cyclic, bicyclic, or a combination thereof. Unless otherwise indicated, the alkylene group typically has 1 to 30 carbon atoms. In some embodiments, the alkylene group has 1 to 20 carbon atoms, 1 to 10 carbon atoms, 1 to 6 carbon atoms, 1 to 4 carbon atoms, or 1 to 3 carbon atoms. Example alkylene groups include methylene, ethylene, 1,3-propylene, 1,2-propylene, 1,4-butylene, 1,4-cyclohexylene, and 1,4-cyclohexyldimethylene.

The term "alkoxy" refers to a group of formula —$OR^a$ where $R^a$ is an alkyl as defined above.

The term "acyloxy" refers to a group of formula —O—(CO)—$R^a$ where $R^a$ is an alkyl are defined above.

The term "aromatic" refers an aromatic group or compound that typically has 3 to 40 carbon atoms or 3 to 30 carbon atoms. The aromatic group or compound can be carbocyclic or can be heterocyclic containing one or more of the heteroatoms (O, N, or S). The aromatic ring can have one ring or can have multiple fused or attached rings that are each carbocyclic or heterocyclic.

The term "aryl" refers to a monovalent group that is aromatic and carbocyclic. The aryl group has at least one aromatic ring. Optionally, the aromatic ring can have one or more additional carbocyclic rings that are fused or attached to the aromatic ring. Any additional rings can be unsaturated, saturated, or aromatic. Unless otherwise specified, aryl groups often have 6 to 20 carbon atoms, 6 to 18 carbon atoms, 6 to 16 carbon atoms, 6 to 12 carbon atoms, or 6 to 10 carbon atoms. Examples of an aryl group include phenyl, naphthyl, biphenyl, phenanthryl, and anthracyl.

The term "aryloxy" refers to a group of formula —$OR^b$ where $R^b$ is an aryl as defined above.

The term "arylene" refers to a divalent group that is aromatic and carbocyclic. The arylene has at least one aromatic ring. Optionally, the aromatic ring can have one or more additional carbocyclic rings that are fused to the aromatic ring. Any additional rings can be unsaturated, saturated, or aromatic. Unless otherwise specified, arylene groups often have 6 to 20 carbon atoms, 6 to 18 carbon atoms, 6 to 16 carbon atoms, 6 to 12 carbon atoms, or 6 to 10 carbon atoms.

The term "alkaryl" refers to a monovalent group that is an aryl substituted with an alkyl group (e.g., as in a tolyl group); the alkaryl can be viewed as being an arylene bonded to an alkyl. Unless otherwise indicated, the alkyl portion often has 1 to 10 carbon atoms, 1 to 6 carbon atoms, or 1 to 4 carbon atoms and the aryl (or arylene) portion often has 6 to 20 carbon atoms, 6 to 18 carbon atoms, 6 to 16 carbon atoms, 6 to 12 carbon atoms, or 6 to 10 carbon atoms.

The term "aralkyl" refers to a monovalent group that is an alkyl group substituted with an aryl group (e.g., as in a benzyl group); the aralkyl group can be viewed as being an alkylene bonded to an aryl. Unless otherwise indicated, the alkyl (or alkylene) portion often has 1 to 10 carbon atoms, 1 to 6 carbon atoms, or 1 to 4 carbon atoms and the aryl portion often has 6 to 20 carbon atoms, 6 to 18 carbon atoms, 6 to 16 carbon atoms, 6 to 12 carbon atoms, or 6 to 10 carbon atoms.

The term "curable" refers to a composition or component that can be cured. The terms "cure" and "cured" refer to joining polymer chains together by covalent chemical bonds, usually via crosslinking molecules or groups, to form a polymeric network. Therefore, the terms "cured" and "crosslinked" may be used interchangeably. A cured or crosslinked polymer is generally characterized by insolubility but may be swellable in the presence of an appropriate solvent.

The term "curable component" as used herein refers to the curable composition minus any optional inorganic filler that may be present. As used herein, the curable composition includes at least the epoxy resin, a curing agent for the epoxy resin having at least two amino groups that are primary and/or secondary amino groups, and an adhesion promoter. It can include other optional materials, which may or may not be reactive, such as a catalyst, toughening agent, organic solvent, and the like.

The term "curable composition" refers to a total reaction mixture that is subjected to curing. As used herein, the curable composition contains both a curable component and optional inorganic fillers.

The term "cured composition" refers to a cured product of a curable composition. It includes the cured product of the curable component plus any optional inorganic filler.

The term "halo" refers to chloro, fluoro, bromo, or iodo groups.

The term "heteroalkylene" refers to a divalent group that is an alkylene in which a carbon atom that is positioned between two other carbon atoms is replaced with a heteroatom selected from oxygen (—O—), sulfur (—S—), or nitrogen (—NH—). Unless otherwise indicated, the heteroalkylene has 2 to 30 carbon atoms, 2 to 20 carbon atoms, 2 to 10 carbon atoms, or 2 to 6 carbon atoms and has 1 to 10 heteroatoms, 1 to 6 heteroatoms, or 1 to 4 heteroatoms.

The term "hydrolyzable group", especially when referring to a silyl group ("a hydrolyzable silyl group"), is a group that can be hydrolyzed. That is, the group can react with water to provide silanol groups (Si—OH groups) that can further react by condensing with groups such as hydroxyl groups, hydroxide groups, or oxide groups on a surface of a substrate. The hydrolysis and condensation reactions may occur spontaneously and/or in the presence of a hydrolysis/condensation catalyst. Examples of hydrolyzable groups often include halo groups, alkoxy groups, aryloxy groups, and acyloxy groups.

The term "plurality" means two or more (i.e., at least two).

The term "room temperature" refers to a temperature of 22° C. to 25° C.

The recitation of numerical ranges by endpoints includes the endpoints, all numbers within that range (e.g., 1 to 5 includes 1, 1.5, 2, 2.75, 3, 3.80, 4, and 5), and any range within that range.

Adhesion Promoter

The adhesion promoter has at least one epoxide group and a plurality of hydrolyzable silyl groups. The epoxide group allows incorporation of the adhesion promoter into the polymeric matrix of the cured composition by reacting with the curing agent for the epoxy resin. The hydrolyzable silyl groups allow reaction with a substrate having hydroxyl groups or other groups on its surface that can react with the hydrolyzable silyl groups. This reaction results in the covalent attachment of the adhesion promoter to the substrate. That is, the adhesion promoter can react such that is it covalently attached to both the polymeric matrix and to the substrate. These two reactions tend to enhance the adhesion of the cured composition to the substrate.

The adhesion promotor is a reaction product of three materials: 1) a polyepoxide having at least two epoxide groups, 2) an aminosilane, and 3) an isocyanato silane. The product of this reaction has at least one epoxide group and a plurality of hydrolyzable silyl group.

The polyepoxide used to form the adhesion promoter contains at least two epoxide groups (i.e., oxirane groups) and at least one epoxide groups remain unreacted in the adhesion promoter that is formed. As used herein, the term epoxide group refers to the following divalent group.

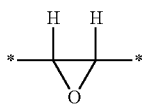

The asterisks denote a site of attachment of the epoxide group to another group. If the epoxide group is at the terminal position of the epoxy resin, the epoxide group is typically bonded to a hydrogen atom.

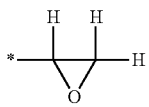

The epoxide groups are often, but not necessarily, part of a glycidyl group as shown below.

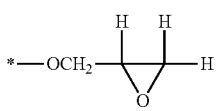

Useful polyepoxides have at least two epoxide groups. For example, the polyepoxide may have at least three epoxide groups, at least four epoxide groups, at least five epoxide groups, or even at least six epoxide groups. For example, the polyepoxide can have 2 to 10, 2 to 6, or 2 to 4 epoxide groups per molecule. Many polyepoxides are commercially available. Others can be readily synthesized by conventional methods.

Exemplary polyepoxides include monomeric polyepoxides, oligomeric polyepoxides, and polymeric polyepoxides. Suitable polyepoxides may contain one or more glycidyl groups, be free of glycidyl groups, or contain a mixture of glycidyl and non-glycidyl epoxy groups. Useful polyepoxides may include both aromatic polyepoxides and aliphatic polyepoxides including cycloaliphatic polyepoxides. Mixtures of polyepoxides may also be used.

Examples of suitable polyepoxides containing glycidyl groups include bisphenol A diglycidyl ether, bisphenol F diglycidyl ether, polyglycidyl ethers of polyhydric phenols such as bisphenol A-type resins and their derivatives, epoxy cresol-novolac resins, and epoxy phenol-novolac resins. Other examples are glycidyl esters of aromatic carboxylic acids (e.g., phthalic acid diglycidyl ester, isophthalic acid diglycidyl ester, trimellitic acid triglycidyl ester, and pyromellitic acid tetraglycidyl ester), and N,N,N',N'-tetraglycidyl-4,4'-methylenebisbenzenamine, ethylene glycol diglycidyl ether, N,N-diglycidyl-4-glycidyloxyaniline, propylene glycol diglycidyl ether, tetramethylene glycol diglycidyl ether, 1,6-hexanediol diglycidyl ether, polyethylene glycol diglycidyl ether, polypropylene glycol diglycidyl ether, polytetramethylene glycol diglycidyl ether, neopentyl glycol diglycidyl ether, trimethylolpropane triglycidyl ether, glycerol triglycidyl ether, pentaerythritol polyglycidyl ether, sorbitol polyglycidyl ether, polyglycerol polyglycidyl ether, polyglycidyl esters of polyvalent fatty acids include diglycidyl oxalate, diglycidyl maleate, diglycidyl succinate, diglycidyl glutarate, diglycidyl adipate, and diglycidyl pimelate. Examples of commercially available polyepoxides containing glycidyl groups include those having the trade designation ARALDITE (e.g., ARALDITE MY-720, ARALDITE MY-721, ARALDITE 0510, ARALDITE PY-720, and ARALDITE EPN 1179), available from Huntsman Chemical Company; those having the trade designation EPON RESIN (e.g., EPON RESIN 828, EPON RESIN 826, EPON RESIN 862 and EPON RESIN CS-377) available from Momentive Specialty Chemicals (Houston, Tex.); and aromatic polyepoxides having the trade designations D.E.R. (e.g., D.E.R. 330), and D.E.N. (e.g., D.E.N. 438 and D.E.N. 439) available from Dow Chemical Co. (Midland, Mich.). In some preferred embodiments, the polyepoxide comprises an epoxidized novolac or resole resin. In some preferred embodiments, the polyepoxide comprises N,N-diglycidyl-4-glycidyloxyaniline.

Examples of suitable polyepoxides that are free of glycidyl groups include epoxy cyclohexane carboxylates (e.g., 3,4-epoxy cyclohexylmethyl 3,4-epoxy cyclohexane-carboxylate (available, for example, as ERL-4221 from Dow Chemical Co., 3,4-epoxy-2-methylcyclohexylmethyl 3,4-epoxy-2-methylcyclohexanecarboxylate, bis(3,4-epoxy-6-methylcyclohexylmethyl) adipate, 3,4-epoxy-6-methylcyclohexylmethyl 3,4-epoxy-6-methylcyclohexanecarboxylate (available, for example, as ERL-4201 from Dow Chemical Co.); vinylcyclohexene dioxide (available, for example, as ERL-4206 from Dow Chemical Co.); bis(2,3-epoxycyclopentyl)ether (available, for example, as ERL-0400 from Dow Chemical Co.), bis(3,4-epoxy-6-methylcyclohexylmethyl) adipate (available, for example, as ERL-4289 from Dow Chemical Co.), dipenteric dioxide (available, for example, as ERL-4269 from Dow Chemical Co.), 2-(3,4-epoxy cyclohexyl-5, r-spiro-3',4'-epoxycyclohexane-1,3-dioxane, and 2,2-bis(3,4-epoxycyclohexyl)propane. Other examples include epoxidized polybutadiene and various epoxidized oils such as epoxidized soybean oil, epoxidized linseed oil, epoxidized canola oil, epoxidized cottonseed oil, epoxidized safflower oil, and epoxidized sunflower oil. The polyepoxide is reacted with an aminosilane. Suitable aminosilane compounds are usually of Formula (I).

$$HN(R^1)(Z^1—Si(L^1)_x(L^2)_{3-x}) \quad (I)$$

In Formula (I), group $R^1$ is hydrogen, alkyl, or a group of formula $—Z^1—Si(L^1)_x(L^2)_{3-x}$. Group $L^1$ is a hydrolyzable group and $L^2$ is an alkyl. The variable x is an integer equal to 1, 2, or 3. Group $Z^1$ is a divalent linking group having 1 to 12 carbon atoms.

Each $Z^1$ independently represents a divalent linking group having from 1 to 12 carbon atoms or 1 to 6 carbon atoms. Suitable $Z^1$ groups are often aliphatic, aromatic, or a combination thereof (e.g., an arylene and an alkylene group). For example, the $Z^1$ group can be an alkylene, heteroalkylene, arylene, or a combination thereof. Example alkylene $Z^1$ groups include, but are not limited to, methylene, ethane-1,2-diyl, propane-1,2-diyl, propane-1,3-diyl, butane-1,4-diyl, and cyclohexane-1,4-diyl. Example heteroalkylene $Z^1$ groups include, but are not limited to those with oxygen heteroatoms such as $—(CH_2)_p—O—(CH_2)_p—$ where p is 1, 2, 3, or 4. Example arylene or alkylene-arylene groups include, but are not limited to, phenylene and groups of formula $—(CH_2)_n—C_6H_4—$ where n is 1, 2 or 3.

The silyl group $(—Si(L^1)_x(L^2)_{3-x})$ can have 1, 2, or 3 hydrolyzable $L^1$ groups. The hydrolyzable groups are typically selected from halo, alkoxy, acyloxy, or aryloxy groups as defined above. Suitable alkoxy groups often have 1 to 6 carbon atoms, 1 to 4 carbon atoms, 1 to 3 carbon atoms, or 1 to 2 carbon atoms. The alkoxy group is often methoxy or ethoxy. Suitable acyloxy groups often have 2 to 7 carbon atoms, 2 to 6 carbon atoms, or 2 to 4 carbon atoms. For example, the acyloxy group can be $—O(CO)—CH_3$. The halo group is often chloro or bromo. While there may be only 1 hydrolyzable group $L^1$ (x is 1), it is often preferable that there are either 2 or 3 such groups (x is 2 or 3) to increase the probability of reacting with a hydroxyl group on the substrate. In many embodiments, $L^1$ is an alkoxy or halo group. Group $L^2$ is a non-hydrolyzable group and is typically an alkyl group such as an alkyl group having 1 to 6 carbon atoms, 1 to 4 carbon atoms, 1 to 3 carbon atoms, or 1 to 2 carbon atoms. The alkyl group is often methyl or ethyl. While there may be up to two non-hydrolyzable $L^2$ groups, it is often preferable that there are either zero or one non-hydrolyzable group. In some preferred embodiments, x is equal to 3 and the aminosilane is of Formula (I-A).

$$HN(R^1)(Z^1—Si(L^1)_3) \quad (I\text{-}A)$$

Group $R^1$ in Formulas (I) and (I-A) is hydrogen, alkyl, or a group of formula $—Z^1—Si(L^1)_x(L^2)_{3-x}$. If $R^1$ is an alkyl, the alkyl often has 1 to 6 carbon atoms, 1 to 4 carbon atoms, or 1 to 3 carbon atoms. If $R^1$ is a group of formula $—Z^1—Si(L^1)_x(L^2)_{3-x}$, the aminosilane has two silyl groups as shown in Formula (I-B).

$$HN(Z^1—Si(L^1)_x(L^2)_{3-x})_2 \quad (I\text{-}B)$$

In some preferred embodiments of Formula (I-B), x is equal to 3 and the aminosilane is of Formula (I-C).

$$HN(Z^1—Si(L^1)_3)_2 \quad (I\text{-}C)$$

This may be advantageous for increasing the probability of reaction of the adhesion promoter with the substrate.

Exemplary useful aminosilanes include, but are not limited to, bis(triethoxysilylpropyl)amine, bis(trimethoxysilylpropyl)amine, N-methylaminopropyltrimethoxysilane, N-methylaminopropyltriethoxysilane, and N-(3-(trimethoxysilyl)propyl)butylamine. Aminosilanes are commercially available from companies such as Gelest (Morrisville, Pa.) and Evonik (Parsippany, N.J.). Alternatively, the aminosilane can be prepared using conventional methods.

Not all the epoxide groups of the polyepoxide are reacted with the aminosilane. On an average basis, often no more than half of the epoxide groups of the polyepoxide are reacted with the aminosilane. In some embodiments, from one to three epoxy groups of the polyepoxide are reacted with the aminosilane. In other embodiments, one or two epoxide groups of the polyepoxide are reacted with the aminosilane.

In general, simple mixing with optional mild heating is sufficient to react the aminosilane with the polyepoxide. If desired, elevated temperatures (e.g., about 70° C.) can be used. The reaction may be carried out in an organic solvent or under solventless (solvent free) conditions.

After reaction of the aminosilane with an epoxide group of the polyepoxide, a hydroxyl group is generated that is subsequently capped by reaction with an isocyanato group of the isocyanato silane, optionally can occur in the presence of a urethane condensation catalyst such as, for example, di-n-butyltin dilaurate. The reaction with the isocyanato silane completes the formation of the adhesion promoter. This reaction can be conducted at elevated temperatures (e.g., near 50° C.) and/or under vacuum to accelerate solvent removal.

Suitable isocyanto silane compounds are of Formula (II).

$$O=C=N—Z^2—Si(L^3)_y(L^4)_{3-y} \quad (II)$$

In Formula (II), $L^3$ is a hydrolyzable group and $L^4$ is an alkyl. The variable y is an integer equal to 1, 2, or 3. Group $Z^2$ is a divalent linking group having 1 to 12 carbon atoms.

Each $Z^2$ independently represents a divalent linking group having from 1 to 12 carbon atoms or 1 to 6 carbon atoms. Suitable $Z^2$ groups are often aliphatic, aromatic, or a combination thereof (e.g., an arylene and an alkylene group). For example, the $Z^2$ group can be an alkylene, heteroalkylene, arylene, or a combination thereof. Example alkylene $Z^2$ groups include, but are not limited to, methylene, ethane-1,2-diyl, propane-1,2-diyl, propane-1,3-diyl, butane-1,4-diyl, and cyclohexane-1,4-diyl. Example heteroalkylene $Z^2$ groups include, but are not limited to those with oxygen heteroatoms such as $—(CH_2)_p—O—(CH_2)_p—$ where p is 1, 2, 3, or 4. Example arylene or alkylene-arylene groups include, but are not limited to, phenylene and groups of formula $—(CH_2)_n—C_6H_4—$ where n is 1, 2 or 3.

The silyl group $(—Si(L^3)_y(L^4)_{3-y})$ can have 1, 2, or 3 hydrolyzable $L^3$ groups. The hydrolyzable groups are typically selected from halo, alkoxy, acyloxy, or aryloxy groups as defined above. Suitable alkoxy groups often have 1 to 6 carbon atoms, 1 to 4 carbon atoms, 1 to 3 carbon atoms, or 1 to 2 carbon atoms. The alkoxy group is often methoxy or ethoxy. Suitable acyloxy groups often have 2 to 7 carbon atoms, 2 to 6 carbon atoms, or 2 to 4 carbon atoms. For example, the acyloxy group can be $—O(CO)—CH_3$. The halo group is often chloro or bromo. While there may be only 1 hydrolyzable group $L^3$ (y is 1), it is often preferable that there are either 2 or 3 such groups (y is 2 or 3) to increase the probability of reacting with a hydroxyl group on the substrate. In many embodiments, $L^3$ is an alkoxy or halo group. Group $L^4$ is a non-hydrolyzable group and is typically an alkyl group such as an alkyl group having 1 to 6 carbon atoms, 1 to 4 carbon atoms, 1 to 3 carbon atoms, or 1 to 2 carbon atoms. The alkyl group is often methyl or ethyl. While there may be up to two non-hydrolyzable $L^4$ groups, it is often preferable that there is either zero or one non-hydrolyzable group. In some preferred embodiments, y is equal to 3 and the aminosilane is of Formula (II-A).

$$O=C=N-Z^2-Si(L^3)_3 \tag{II-A}$$

Example isocyanato silanes include 3-isocyanatopropyl-trimethoxysilane, 3-isocyanatopropyltriethoxysilane (i.e., 3-(triethoxysilyl)propyl isocyanate), 2-isocyanatoethyl-trimethoxysilane, and 2-isocyanatoethyltriethoxysilane. Combinations of isocyanato silanes may also be used. Various isocyanato silanes are commercially available or can be readily synthesized by conventional methods.

The amount of the isocyanato silane is typically selected to react in a stoichiometric amount with the hydroxyl groups formed by the ring opening reaction of one or more epoxide groups of the polyepoxide with the aminosilane. The reaction with the isocyanato silane often occurs with mild heating, optionally in the presence of a urethane condensation catalyst such as, for example, di-n-butyltin dilaurate.

FIG. 1 shows an overall schematic reaction scheme for formation of the adhesive promoter. A polyepoxide (shown schematically with three epoxide groups) is reacted with the aminosilane of Formula (I). Although the polyepoxide is shown as a circular material in FIG. 1 for simplicity of explanation, there is no requirement that the polyepoxide by cyclic (and in most cases the polyepoxide is not circular). The resulting intermediate product has at least one remaining epoxide group (the intermediate product is shown schematically with two remaining epoxide groups). There is at least one group of formula $-CHOH-CH_2-N(R^1)(Z^1-Si(L^1)_x(L^2)_{3-x})-$ on the intermediate product. The intermediate has a hydroxyl group that is reacted with the isocyanato silane of Formula (II). The final adhesive promoter has at least one remaining epoxide group (the adhesive promoter shown schematically has two remaining epoxide groups). There is at least one group of Formula (III).

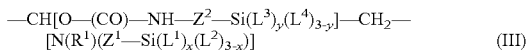
$$-CH[O-(CO)-NH-Z^2-Si(L^3)_y(L^4)_{3-y}]-CH_2-[N(R^1)(Z^1-Si(L^1)_x(L^2)_{3-x})] \tag{III}$$

The groups $R^1$, $Z^1$, $Z^2$, $L^1$, $L^2$, $L^3$, $L^4$, x, and y are the same as defined above. The variables x and y are often equal to 3 and Formula (III) is of Formula (III-A).

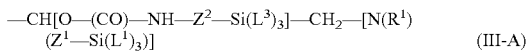
$$-CH[O-(CO)-NH-Z^2-Si(L^3)_3]-CH_2-[N(R^1)(Z^1-Si(L^1)_3)] \tag{III-A}$$

The adhesive promoter can be applied to the surface of a substrate having groups that can react with the hydrolyzable silyl group. The hydrolyzable silyl group can react, for example with a substrate having hydroxy groups (such as a polymeric substrate having hydroxyl groups), hydroxide groups (such a substrate having inorganic hydroxide groups on its surface), or oxide groups (such as a substrate having inorganic oxide groups on its surface). Typically, this can be accomplished under solvent-free conditions by applying the adhesion promoter to the substrate; however, an organic solvent may be used if desired, for example, to achieve a low coating weight. After application of the adhesion promoter to the substrate, the remaining materials of the curable composition can be applied. Alternatively, the adhesion promoter can be mixed with one or more (including all) materials of the curable composition before application of the curable composition on the substrate.

Overall, the curable component typically contains 0.1 to 10 weight percent of the adhesive promoter (but this can be coated onto the substrate prior to the remainder of the curable component or composition, if desired). The amount is often at least 0.5 weight percent, at least 1 weight percent, at least 1.5 weight percent, at least 2 weight percent, at least 3 weight percent and up to 10 weight percent, up to 8 weight percent, up to 6 weight percent, or up to 5 weight percent based on the total weight of the curable component. For purposes of describing the amount of materials in the curable component, the adhesive promoter is considered part of the curable component even if it is applied to a substrate prior to the remaining materials of the curable component.

Epoxy Resin

The curable composition includes an epoxy resin. The epoxy resin typically has at least two glycidyl groups.

Suitable epoxy resins may include aromatic polyepoxide resins (e.g., a chain-extended diepoxide or novolac epoxy resin having at least two epoxide groups), aromatic monomeric diepoxides, aliphatic polyepoxide, or aliphatic monomeric diepoxides. The aromatic polyepoxide or aromatic monomeric diepoxide typically contains at least one (e.g., in a range of 1 to 6, 1 to 4, 2 to 6, or 2 to 4) aromatic ring that is optionally substituted by a halogen (e.g., fluoro, chloro, bromo, iodo), alkyl having 1 to 4 carbon atoms (e.g., methyl or ethyl), or hydroxyalkyl having 1 to 4 carbon atoms (e.g., hydroxymethyl). For epoxy resins containing two or more aromatic rings, the rings may be connected, for example, by a branched or straight-chain alkylene group having 1 to 4 carbon atoms that may optionally be substituted by halogen (e.g., fluoro, chloro, bromo, iodo).

Examples of aromatic epoxy resins may include novolac epoxy resins (e.g., phenol novolacs, ortho-, meta-, or epoxy resin para-cresol novolacs, or combinations thereof), bisphenol epoxy resins (e.g., bisphenol A, bisphenol F, halogenated bisphenol epoxies, and combinations thereof), resorcinol epoxy resins, tetrakis phenylolethane epoxy resins, and combinations of any of these. Useful epoxy compounds include diglycidyl ethers of difunctional phenolic compounds (e.g., p,p'-dihydroxydibenzyl, p,p'-dihydroxydiphenyl, p,p'-dihydroxyphenyl sulfone, p,p'-dihydroxybenzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane). In some embodiments, the epoxy resin includes a bisphenol diglycidyl ether, wherein the bisphenol (i.e., $-O-C_6H_5-CH_2-C_6H_5-O-$ group) may be unsubstituted (e.g., bisphenol F), or wherein either of the phenyl rings or the methylene group may be substituted by one or more halogens (e.g., fluoro, chloro, bromo, iodo), methyl groups, trifluoromethyl groups, or hydroxymethyl groups.

Examples of aromatic monomeric diepoxides useful in the curable component as the epoxy resin include, but are not limited to, the diglycidyl ether of bisphenol A, the diglycidyl ether of bisphenol F, and mixtures thereof. Bisphenol epoxy resins, for example, may be chain extended to have any desirable epoxy equivalent weight. Chain extending epoxy resins can be carried out by reacting a monomeric diepoxide, for example, with a bisphenol in the presence of a catalyst to make a linear polymer.

The aromatic epoxy resin (e.g., either a bisphenol epoxy resin or a novolac epoxy resin) often has an epoxy equivalent weight of at least 150, 170, 200, or 225 grams per equivalent. The epoxy equivalent weight can be up to 2000, 1500, or 1000 grams per equivalent. In some embodiments, the aromatic epoxy resin may have an epoxy equivalent weight in a range of 150 to 2000, 150 to 1000, or 170 to 900 grams per equivalent. For example, the epoxy resin can have an epoxy equivalent weight in a range of 150 to 450, 150 to 350, or 150 to 300 grams per equivalent. Epoxy equivalent weights may be selected, for example, so that the epoxy resin may be used as a liquid or solid, as desired.

In some embodiments, in addition or as an alternative to aromatic epoxy resins, the epoxy resins may include one or more non-aromatic epoxy resins. In some cases, non-aromatic (i.e., aliphatic) epoxy resins can be useful as reactive diluents that may help control the flow characteristics of the compositions. Non-aromatic epoxy resins useful in the curable compositions include, for example, a branched or straight-chain alkylene group having 1 to 20 carbon atoms optionally interrupted with at least one —O— and optionally substituted by hydroxyl. In some embodiments, the non-aromatic epoxy can include a poly(oxyalkylene) group having a plurality (q) of oxyalkylene groups, —OR$^6$—, wherein each R$^6$ is independently an alkylene having 2 to 5 carbon atoms. In some embodiments, R$^6$ is an alkylene with 2 to 4 carbon atoms, q is 2 to about 6 (or even higher), 2 to 5, 2 to 4, or 2 to 3. To become crosslinked into a network, useful non-aromatic epoxy resins will typically have at least two epoxy end groups.

Examples of useful non-aromatic epoxy resins include glycidyl epoxy resins such as those based on diglycidyl ether compounds comprising one or more oxyalkylene units. Examples of these epoxy resins include ethylene glycol diglycidyl ether, propylene glycol diglycidyl ether, diethylene glycol diglycidyl ether, dipropylene glycol diglycidyl ether, polyethylene glycol diglycidyl ether, polypropylene glycol diglycidyl ether, glycerol diglycidyl ether, glycerol triglycidyl ether, propanediol diglycidyl ether, butanediol diglycidyl ether, and hexanediol diglycidyl ether. Other useful non-aromatic epoxy resins include a diglycidyl ether of cyclohexane dimethanol, a diglycidyl ether of neopentyl glycol, a triglycidyl ether of trimethylolpropane, and a diglycidyl ether of 1,4-butanediol.

In some embodiments, the epoxy resins may be liquid at room temperature. Several suitable epoxy resins are commercially available. For example, several epoxy resins of various classes and epoxy equivalent weights are available from Dow Chemical Company, Midland, Mich. Hexion, Inc., Columbus, Ohio; Huntsman Advanced Materials, The Woodlands, Tex.; CVC Specialty Chemicals Inc., Akron, Ohio (acquired by Emerald Performance Materials); and Nan Ya Plastics Corporation, Taipei City, Taiwan. Examples of commercially available glycidyl ethers include diglycidyl ethers of bisphenol A (e.g., those available under the trade designations "EPON" from Hexion Inc. Columbus, Ohio (e.g., EPON 828, EPON 1001, EPON 1310, and EPON 1510), those available under the trade designation "D.E.R." from Dow Chemical Co. (e.g., D.E.R. 331, 332, and 334), those available under the trade designation "EPICLON" from Dainippon Ink and Chemicals, Inc. (e.g., EPICLON 840 and 850), and those available under the trade designation "YL-980" from Japan Epoxy Resins Co., Ltd.)); diglycidyl ethers of bisphenol F (e.g., those available under the trade designation "EPICLON" from Dainippon Ink and Chemicals, Inc. (e.g., EPICLON 830)); polyglycidyl ethers of novolac resins (e.g., novolac epoxy resins, such as those available under the trade designation "D.E.N." from Dow Chemical Co. (e.g., D.E.N. 425, 431, and 438)); and flame retardant epoxy resins (e.g., D.E.R. 580, a brominated bisphenol type epoxy resin available from Dow Chemical Co.). Examples of commercially available non-aromatic epoxy resins include the diglycidyl ether of cyclohexane dimethanol, available from Hexion Inc., Columbus Ohio, under the trade designation HELOXY MODIFIER 107.

The amount of the epoxy resin in the curable component is often in a range of 40 to 80 weight percent based on a total weight of the curable component. The amount is often at least 40 weight percent, at least 45 weight percent, at least 50 weight percent, at least 55 weight percent, at least 60 weight percent, at least 65 weight percent and can be up to 80 weight percent, up to 75 weight percent, up to 70 weight percent, up to 65 weight percent, or up to 60 weight percent.

Curing Agent

The curing agent is a nitrogen-containing compound having at least two amino groups that are primary and/or secondary amino groups. That is, the curing agent has reactive amine hydrogen (—NH) groups. The primary and/or secondary amino groups are of formula —NHR$^2$ where R$^2$ is hydrogen, alkyl, aryl, aralkyl, or alkaryl. Suitable alkyl groups often have 1 to 12 carbon atoms, 1 to 8 carbon atoms, 1 to 6 carbon atoms, or 1 to 4 carbon atoms. The alkyl group can be cyclic, branched, linear, or a combination thereof. Suitable aryl groups usually have 6 to 12 carbon atoms such as a phenyl or biphenyl group. Suitable aralkyl groups often have an alkylene portion having 1 to 10 carbon atoms, 1 to 6 carbon atoms, or 1 to 4 carbon atoms and an aryl portion having 6 to 20 carbon atoms, 6 to 12 carbon atoms, or 6 to 10 carbon atoms. An example aralkyl is benzyl. Suitable alkaryl groups often have an arylene portion having 6 to 20 carbon atoms, 6 to 18 carbon atoms, 6 to 16 carbon atoms, 6 to 12 carbon atoms, or 6 to 10 carbon atoms and an alkyl portion having 1 to 10 carbon atoms, 1 to 6 carbon atoms, or 1 to 4 carbon atoms. An example alkaryl is a tolyl group. In most embodiments, R$^2$ is hydrogen or alkyl.

The primary and/or secondary amino groups of the curing agent react with the epoxide groups of the epoxy resin. This reaction opens the epoxide groups and covalently bonds the curing agent to the epoxy resin. The reaction results in the formation of divalent groups of formula —OCH$_2$—CH$_2$—NR$^2$— where R$^2$ is the same as defined above.

The curing agent minus the at least two amino groups (i.e., the portion of the curing agent that is not an amino group) can be any suitable aromatic group, aliphatic group, or combination thereof. Some amine curing agents are of Formula (IV) with the additional limitation that there are at least two primary amino groups, at least two secondary amino groups, or at least one primary amino group and at least one secondary amino group.

(IV)

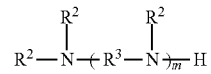

Each R$^2$ group is independently hydrogen, alkyl, aryl, aralkyl, or alkaryl as defined above. Each R$^3$ is independently an alkylene, heteroalkylene, or combination thereof. Suitable alkylene groups often have 1 to 20 carbon atoms, 1 to 16 carbon atoms, 1 to 10 carbon atoms, 1 to 6 carbon atoms, or 1 to 4 carbon atoms. Suitable heteroalkylene groups have at least one oxy, thio, or —NH— group positioned between two alkylene groups. Suitable heteroalkylene groups often have 2 to 50 carbon atoms, 2 to 40 carbon atoms, 2 to 30 carbon atoms, 2 to 20 carbon atoms, or 2 to 10 carbon atoms and up to 20 heteroatoms, up to 16 heteroatoms, up to 12 heteroatoms, or up to 10 heteroatoms. The heteroatoms are often oxy groups. The variable m is an integer equal to at least one and can be up to 10 or higher, up to 5, up to 4, or up to 3.

Some amine curing agents can have an $R^3$ group selected from an alkylene group. Examples include, but are not limited to, ethylene diamine, diethylene triamine, triethylene tetramine, propylene diamine, dipropylene triamine, tetraethylene pentamine, hexaethylene heptamine, hexamethylene diamine, 2-methyl-1,5-pentamethylene diamine, 1-amino-3-aminomethyl-3,3,5-trimethylcyclohexane (also called isophorene diamine), 1,3 bis-aminomethylcyclohexane, 1,10-dimainodecane, 1,12-diaminododecene, and the like.

Other amine curing agents can have an $R^3$ group selected from a heteroalkylene group such as a heteroalkylene having oxygen heteroatoms. For example, the curing agent can be a compound such as aminoethylpiperazine, 4,7,10-trioxatridecane-1,13-diamine (TTD) (which is available from TCI America in Portland, Oreg., USA), or a poly(alkylene oxide) diamine (also called polyether diamines) such as a polyethylene oxide) diamine, polypropylene oxide) diamine, or a copolymer thereof. Polyether diamines are commercially available under the trade designation JEFF AMINE from Huntsman Corporation in The Woodlands, Tex., USA.

Still other amine curing agents can be formed by reacting a polyamine (i.e., a polyamine refers to an amine with at least two amino groups selected from primary amino groups and/or secondary amino groups) with another reactant such as an epoxy resin to form an amino-containing adduct (e.g., polyamine adduct) having at least two amino groups that are primary and/or secondary amino groups. The polyamine can be of Formula (IV). For example, a polyamine of Formula (IV) can be reacted with a diglycidyl epoxide to form an adduct having at least two amino groups.

In some embodiments of forming the adduct, a diamine can first be reacted with a dicarboxylic acid in a molar ratio of diamine to dicarboxylic acid that is greater than or equal to 2:1 to form a polyamidoamine having two terminal amino groups. Such a polyamidoamine can be prepared as described, for example, in U.S. Pat. No. 5,629,380 (Baldwin et al.). The polyamidoamine can be reacted as the poly amine with an epoxy resin to form the amino-containing adduct.

When the polyamine is a diamine and it is reacted with an epoxy resin having two glycidyl groups in a molar ratio of diamine to epoxy resin greater than or equal to 2:1, a polyamine adduct having two amino groups can be formed. This product is often a polymeric material. A molar excess of the diamine (which can be polymeric, if desired) is often used so that the curing agent includes both the amine-containing adduct plus free (non-reacted) diamine (which can be polymeric, if desired). For example, the molar ratio of diamine to epoxy resin with two glycidyl groups can be greater than 2.5:1, greater than 3:1, greater than 3.5:1, or greater than 4:1.

The curing agent can also be one or more aromatic rings substituted with multiple amino groups or with amino-containing groups. Such curing agents include, but are not limited to, xylene diamines (e.g., meta-xylene diamine) or similar compounds. For example, one such curing agent is commercially available under the trade designation ANCAMINE (e.g., ANCAMINE 2609) from Air Products and Chemicals, Inc. (Allentown, Pa., USA) and under the trade designation ARADUR 2965 from Huntsman Corporation (The Woodlands, Tex., USA). This curing agent is based on meta-xylene diamine. Another example curing agent is 4,4'-diaminodiphenyl sulfone (DDS), which is commercially available as ARADUR 9964-1 from Huntsman Corporation.

Still other curing agents include hydrazine, hydrazide or derivatives thereof (e.g., aminodihydrazide, adipic dihydrazide, and isophthalyl dihydrazide), guanidines or derivatives thereof, and dicyanamide (DICY) or derivatives thereof.

The amount of the curing agent is dependent on its molecular weight and often contains a mixture of different curing agents such as a mixture of different curing agents selected from non-polymeric curing agents, polymeric curing agent, and polyamine adducts. Further, the amount of the curing agent is also dependent on the number of amino groups (reactive amine hydrogen groups) per mole of the curing agent. Overall, the amount of the curing agent is often in a range of 10 to 60 weight percent based on a total weight of the curable component. For example, the amount can be at least 10 weight percent, at least 15 weight percent, at least 20 weight percent, at least 25 weight percent, at least 30 weight percent, at least 35 weight percent, or at least 40 weight percent and up to 60 weight percent, up to 55 weight percent, up to 50 weight percent, up to 45 weight percent, up to 40 weight percent, up to 35 weight percent, or up to 30 weight percent.

Optional Curing Catalyst

In addition to a curing agent such as those described above, the curable component can further include a curing catalyst. These curing catalyst compounds can be accelerators for self-polymerization of the epoxy resin or for reaction of the epoxy resin with the curing agent.

Some curing catalysts are phenols substituted with tertiary amino groups and can be of Formula (V).

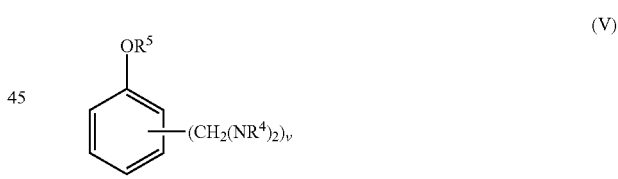

In Formula (V), each group $R^4$ is independently an alkyl. The variable v is an integer equal to 2 or 3. Group $R^5$ is hydrogen or alkyl. Suitable alkyl groups for $R^4$ and $R^5$ often have 1 to 12 carbon atoms, 1 to 8 carbon atoms, 1 to 6 carbon atoms, or 1 to 4 carbon atoms. One exemplary secondary curative of Formula (V) is tris-2,4,6-(dimethylaminomethyl) phenol (i.e., tris(dimethylaminomethyl)phenol) that is commercially available under the trade designation ANCAMINE K54 from Air Products and Chemicals, Inc. (Allentown, Pa., USA) and under the trade designation VERSAMID EH 30 from Gabriel Performance Products (Akron, Ohio, USA).

Another class of curing catalysts are substituted ureas such as, for example, bis-substituted ureas. Examples include, but are not limited to, 4,4'-methylene bis(phenyl dimethyl) urea, toluene diisocyanate urea, 3-(4-chlorophenyl)-1,1-dimethylurea, and various compounds that are commercially available from CVC Thermoset Specialties under the trade designation OMICURE (e.g., OMICURE U-35 (which is a cycloaliphatic bisurea), U-52, and U-52M).

Yet another class of curing catalysts are various sulfonic acidic compounds and salts thereof, such as those commercially available under the trade designation NACURE from King Industries, Inc. (Norwalk, Conn., USA).

Still other curing catalysts are imidazoles or salts thereof or imidazolines or salts thereof. A first type of these compounds can react with an epoxy resin at room temperature. A second type of these compounds can react with the epoxy resin after being heated above their melting point (e.g., above 150° C., above 170° C., or above 200° C.). The second type of compounds can be referred to as "latent curatives" or "blocked curatives."

The first type of imidazole compounds (i.e., those that can react below their melting point) are often substituted at the 1-position or the 2-position of the imidazole ring. In epoxy systems, this type of imidazole compound can be used as accelerators or catalysts for other curing agents and can also act as curing catalysts for epoxy resins. Examples of those used as catalysts or accelerators include: 2-methyl-imidazole, 2-ethyl-4-methyl imidazole, 2-phenyl imidazole, 2-phenyl-4-methyl imidazole, 1,2-dimethylimidazole, 2-heptadecyl imidazole, 1-benzyl-2-methyl imidazole, 1-benzyl-2-phenyl-imidazole, and 2-phenyl-4,5-dihydroxymethyl imidazole (commercially available from Air Products and Chemicals Inc., under the trade designation CUREZOL 2PZ-S).

The second type of imidazole compounds (i.e., those that can react above their melting point) are commercially available from Air Products and Chemicals Inc., under the trade designation CUREZOL 2MA-AZINE (which is 2,4-diamino-6(2'-methylimidazoleyl-(1'))ethyl-s-triazine), and CUREZOL 2MA-OK (which is 2,4-diamino-6(2'-methylimidazolyl-(1')(ethyl-s-triazine isocyanurate adduct))), and under the trade designation ARADUR 3123, which is 1-((2-methyl-1H-imidazol-1-yl)methyl)naphthalen-2-ol from Huntsman Corporation. Other imidazole compounds are metal imidazole salts such as those described in U.S. Pat. No. 4,948,449 (Tarbutton et al.).

The amount of the curing catalyst can be in a range of 0 to 10 weight percent based on a total weight of the curable component. If present, the amount is often at least 0.1 weight percent, at least 0.2 weight percent, at least 0.5 weight percent, at least 1 weight percent, or at least 2 weight percent and up to 10 weight percent, up to 8 weight percent, up to 6 weight percent, up to 5 weight percent, or up to 4 weight percent.

Optional Toughening Agents

The curable composition may also include one or more optional toughening agents. Such toughening agents may be useful, for example, for improving the properties (e.g., peel strength) of some cured compositions so that they are less likely to undergo brittle failure in a fracture. The toughening agent (e.g., an elastomeric resin or elastomeric filler) may or may not be covalently bonded within the final crosslinked network of the cured composition. In some embodiments, the toughening agent may include an epoxy-terminated compound, which can be incorporated into the polymeric backbone.

Examples of useful toughening agents, which may also be referred to as elastomeric modifiers, include polymeric compounds having both a rubbery phase and a thermoplastic phase such as graft copolymers having a polymerized diene rubbery core and a polyacrylate or polymethacrylate shell; graft copolymers having a rubbery core with a polyacrylate or polymethacrylate shell; elastomeric particles polymerized in situ in the epoxide from free-radical polymerizable monomers and a copolymeric stabilizer; elastomer molecules such as polyurethanes and thermoplastic elastomers; separate elastomer precursor molecules; combination molecules that include epoxy-resin segments and elastomeric segments; and, mixtures of such separate and combination molecules. The combination molecules may be prepared by reacting epoxy resin materials with elastomeric segments; the reaction can leave reactive functional groups, such as unreacted epoxy groups, on the reaction product. The use of toughening agents in epoxy resins is described in the Advances in Chemistry Series No. 208, titled "Rubbery-Modified Thermoset Resins", edited by C. K. Riew and J. K. Gillham, American Chemical Society, Washington, 1984. The amount of toughening agent to be used depends, in part, upon the final physical characteristics of the cured resin desired.

The optional toughening agents included in the curable component often contain graft copolymers having a polymerized diene rubbery backbone or core to which is grafted a shell of an acrylic acid ester or methacrylic acid ester, mono-vinyl aromatic hydrocarbon, or a mixture thereof, such as those disclosed in U.S. Pat. No. 3,496,250 (Czerwinski). Rubbery backbones can comprise polymerized butadiene or a polymerized mixture of butadiene and styrene. Shells comprising polymerized methacrylic acid esters can be lower alkyl ($C_{1-4}$) methacrylates. Monovinyl aromatic hydrocarbons can be styrene, alpha-methylstyrene, vinyltoluene, vinylxylene, ethylvinylbenzene, isopropylstyrene, chlorostyrene, dichlorostyrene, and ethylchlorostyrene.

Further examples of useful toughening agents are acrylate core-shell graft copolymers wherein the core or backbone is a polyacrylate polymer having a glass transition temperature ($T_g$) below about 0° C., such as poly(butyl acrylate) or poly(isooctyl acrylate), to which is grafted a polymethacrylate polymer shell having a $T_g$ of about 25° C. such as poly(methyl methacrylate). For acrylic core/shell materials, the term "core" will be understood to be an acrylic polymer having a $T_g$ less than 0° C. and the term "shell" will be understood to be an acrylic polymer having a $T_g$ greater than 25° C. Some core/shell toughening agents (e.g., including acrylic core/shell materials and methacrylate-butadiene-styrene (MBS) copolymers wherein the core is crosslinked styrene/butadiene rubber and the shell is polymethylacrylate) are commercially available, for example, from Dow Chemical Company under the trade designation "PARALOID".

Another useful core-shell rubber is described in U.S. Pat. Appl. Publ. No. 2007/0027233 (Yamaguchi et al.). Core-shell rubber particles as described in this document include a cross-linked rubber core, in most cases being a cross-linked copolymer of butadiene, and a shell which is preferably a copolymer of styrene, methyl methacrylate, glycidyl methacrylate and optionally acrylonitrile. The core-shell rubber can be dispersed in a polymer or an epoxy resin. Examples of useful core-shell rubbers include those sold by Kaneka Corporation under the designation Kaneka KANE ACE, including the Kaneka KANE ACE 15 and 120 series of products (e.g., KANE ACE MX-153, KANE ACE MX-154, KANE ACE MX-156, KANE ACE MX-257, and KANE ACE MX-120) core-shell rubber dispersions, and mixtures thereof. The products contain the core-shell rubber (CSR) particles pre-dispersed in an epoxy resin, at various concentrations. For example, KANE ACE MX-153 core-shell rubber dispersion contains 33 weight percent CSR, KANE ACE MX-154 core-shell rubber dispersion contains 40 weight percent CSR, and KANE ACE MX-156 core-shell rubber dispersions contains 25 weight percent CSR.

Other useful toughening agents include carboxyl- and amine-terminated acrylonitrile/butadiene elastomers such as those obtained from Emerald Performance Materials (Akron, Ohio, USA) under the trade designation "HYPRO" (e.g., CTB and ATBN grades such as HYPRO 1300X42 ATBN); carboxyl- and amine-terminated butadiene polymers such as those obtained from Emerald Performance Materials under the trade designation "HYPRO" (e.g., CTB grade); amine-functional polyethers such as any of those described above; and amine-functional polyurethanes such as those described in U.S. Pat. Appl. No. 2013/0037213 (Frick et al.). These polymers have more than 20 carbon atoms and are not considered to be multifunctional amine compounds as defined herein.

Still other useful toughening agents are phenalkamines with more than 20 carbon atoms such as, for example, phenalkamines commercially available under the trade designation CARDOLITE (e.g, CARDOLITE NC-540). CARDOLITE NC-540 is a product of a Mannich reaction of cashew nutshell liquid, formaldehyde, and certain amines. The cashew nutshell liquid contains cardanol, a phenolic material having an attached $C_{15}H_{27}$ group.

In some embodiments, the toughening agent may include an acrylic core/shell polymer; a styrene-butadiene/methacrylate core/shell polymer; a polyether polymer; a carboxyl- or amino-terminated acrylonitrile/butadiene; a carboxylated butadiene, a polyurethane, or a combination thereof.

The toughening agent can be present in an amount in a range of 0 to 40 weight percent based on the total weight of the curable component. If present, the toughening agent is often present in an amount equal to at least 1 weight percent, at least 2 weight percent, at least 5 weight percent, at least 10 weight percent, at least 15 weight percent, or at least 20 weight percent, and up to 40 weight percent, up to 35 weight percent, up to 30 weight percent, up to 25 weight percent, or up to 20 weight percent.

Other Optional Additives

Further additives can be included in the curable component. For example, additives such as antioxidants/stabilizers, colorants, thermal degradation stabilizers, light stabilizers, tackifiers, flow agents, bodying agents, flatting agents, blowing agents, fungicides, bactericides, surfactants, plasticizers, organic fillers, pigments, flame retardants, dispersants, and other additives known to those skilled in the art can be added. These additives, if present, are added in an amount effective for their intended purpose.

Suitable organic fillers include, for example, carbon block, coal tar, polymeric fibers, carbon fibers, polymeric beads, and the like.

In some embodiments, the curable component may include dispersants that can help stabilize any optional inorganic or organic filler that is in the curable composition. That is, without dispersant, the filler may aggregate, thus adversely affecting the benefit of the inorganic filler in the cured composition. Suitable dispersants may depend on the specific identity and surface chemistry of the filler. In some embodiments, suitable dispersants may include at least a binding group and a compatibilizing segment. The binding group may be ionically bonded to the surface of the filler. Examples of binding groups for inorganic fillers (e.g., metal oxide fillers) include phosphoric acid, phosphonic acid, sulfonic acid, carboxylic acid, and amine. The compatibilizing segment may be selected to be miscible with the curable components. Useful compatibilizing agents may include polyalkylene oxides (e.g., polypropylene oxide, polyethylene oxide), polycaprolactones, and combinations thereof. Commercially available examples include BYK W-9010 (BYK Additives and Instruments), BYK W-9012 (BYK Additives and Instruments), DISBERBYK 180 (BYK Additives and Instruments), and SOLPLUS D510 (Lubrizol Corporation). In some embodiments, the dispersant may be pre-mixed with the filler prior to combining the filler with the curable components. Such pre-mixing may facilitate the filled systems behaving like Newtonian fluids or enabling shear-thinning effects behavior.

The total amount of such additives is typically less than 20 weight percent, less than 15 weight percent, less than 10 weight percent, less than 5 weight percent, or less than 1 weight percent of the curable component.

Curable Component

The curable component includes the adhesion promoter, the epoxy resin and the curing agent having at least two primary and/or secondary amino groups. Other optional materials can also be present such as a curing catalyst, toughening agent, and other optional additives. Any inorganic filler is not considered as part of the curable component. The curable component plus any optional inorganic filler is equal to the curable composition.

The amount of adhesion promoter, epoxy resin, curing agent, polyamine adduct, and the like are determined based on the desired ratio of the moles of amino reactive hydrogens and the moles of epoxide groups. The moles of reactive amine hydrogens (—N—H groups) to moles of epoxide groups is often selected to be in a range of 1.5:1 to 1:1.5. For example, the ratio can be in a range of 1.3:1 to 1:1.3, in a range of 1.2:1 to 1:1.2, in a range of 1.1:1 to 1:1.1, or in a range of 1.05:1 to 1:1.05.

The curable component often contains 40 to 80 weight percent epoxy resin, 0.1 to 10 weight percent adhesion promoter, and 10 to 60 weight percent curing agent. For example, the curable component can contain 40 to 70 weight percent epoxy resin, 0.5 to 10 weight percent adhesion promoter, and 20 to 60 weight percent curing agent or 45 to 70 weight percent epoxy resin, 0.5 to 5 weight percent adhesion promoter, and 25 to 55 weight percent curing agent. Any of these curable components can further include 0 to 10 weight percent curing catalyst, 0 to 40 weight percent toughening agent, and 0 to 20 other optional additives.

The curable composition can be a one-part composition or a two-part composition. If the curable composition is not intended to be used immediately after preparation, the curable composition is typically prepared as a multi-part (e.g., two-part) composition. The materials in each part are selected so that there is no condensation or curing reactions within that part.

Optional Inorganic Fillers

The curable composition can include an optional inorganic filler. More than one inorganic filler can be used, if desired. Generally, any known inorganic fillers may be used. The inorganic fillers can be added to provide various properties to the final cured composition (e.g., strength), to alter the appearance of the final cured composition, or to alter the flow properties (e.g., thixotropic agents) of the curable composition.

The inorganic filler can have any desired form such as particles or fibers. The particles can be spherical, plate-like, acicular, or irregular. The inorganic filler can have any desired dimension. In some applications, the inorganic filler includes glass beads to help control the thickness of the curable composition and the resulting cured composition.

The inorganic fillers can be metal oxides, metal hydroxides, metal oxyhydroxides, metal silicates, metal borides, metal carbides, metal nitrides, and the like. Some inorganic fillers are glass (e.g., glass beads including hollow glass beads or glass fibers) or ceramic materials such as, for example, silicon oxide (e.g., fused or fumed silica), aluminum oxide (e.g., alumina), aluminum trihydroxide (ATH), boron nitride, silicon carbide, beryllium oxide, talc, marble powder, chalk, sand, mica powder, clays, slate powder, or zircon. Some inorganic filler are metals such as copper, aluminum, nickel, chromium, steel, or various alloys.

In some embodiments, the inorganic filler includes a thixotropic agent, which is often fumed silica. The thixotropic agent is added to lower the viscosity of the curable composition. The average particle size of the thixotropic agent is often no greater than 50 nanometers, no greater than 40 nanometers, no greater than 30 nanometers, no greater than 20 nanometers, or no greater than 10 nanometers and is often at least 1 nanometer, at least 2 nanometers, or at least 5 nanometers. The average particle size is that of the largest dimension and can be determined from an electron micrographic image.

The amount of the optional thixotropic agent is often in a range of 0 to 5 weight percent based on a total weight of the curable composition. The amount can be at least 0.5 weight percent, at least 1 weight percent, at least 1.5 weight percent, or at least 2 weight percent and can be up to 5 weight percent, up to 4.5 weight percent, up to 4 weight percent, up to 3.5 weight percent, up to 3 weight percent, up to 2.5 weight percent, or up to 2 weight percent.

To facilitate dispersion and increase inorganic filler loading, in some embodiments, the inorganic fillers may be surface-treated or coated. Generally, any known surface treatments and coatings may be suitable, including those based on silane, titanate, zirconate, aluminate, and organic acid chemistries. In some embodiments, the inorganic filler can be particles that are surface modified with an organic silane. For powder handling purposes, many fillers are available as polycrystalline agglomerates or aggregates with or without binder. In some embodiments, the inorganic fillers may include mixtures of particles and agglomerates of various size and mixtures.

The curing composition can contain 0 to 40 weight percent inorganic filler. The amount of the inorganic filler can be at least 0.5 weight percent, at least 1 weight percent, at least 2 weight percent, at least 5 weight percent, at least 10 weight percent, at least 15 weight percent, or at least 20 weight percent and up to 40 weight percent, up to 35 weight percent, up to 30 weight percent, up to 25 weight percent, up to 20 weight percent, up to 15 weight percent or up to 10 weight percent based on a total weight of the curable composition.

Curable Composition

The curable composition contains both the curable component and the optional inorganic filler. The curable component contains the adhesion promoter, the epoxy resin, and the curing agent having at least two primary and/or secondary amino groups. Other optional materials can also be present such as a curing catalyst, toughening agent, and other optional additives. Any inorganic filler is not considered as part of the curable component. The curable component plus any optional inorganic filler is equal to the curable composition.

The curable composition contains 60 to 100 weight percent curable component and 0 to 40 weight percent inorganic filler. For example, the curable composition can contain 65 to 100 weight percent curable component and 0 to 35 weight percent inorganic filler, 70 to 100 weight percent curable composition and 0 to 30 weight percent inorganic filler, 75 to 100 weight percent curable composition and 0 to 25 weight percent inorganic filler, 80 to 100 weight percent curable composition and 0 to 20 weight percent inorganic filler, 85 to 100 weight percent curable composition and 0 to 15 weight percent inorganic filler, 90 to 100 weight percent curable composition and 0 to 10 weight percent inorganic filler, or 95 to 100 weight percent curable composition and 0 to 5 weight percent inorganic filler.

The curable composition can be a one-part composition or a two-part composition. If the curable composition is not intended to be used immediately after preparation, the curable composition is typically prepared as a multi-part (e.g., two-part) composition. The materials in each part are selected so that no curing reactions occur within that part.

The first part often includes the curing agent for the epoxy resin that has at least two amino groups (i.e., primary and/or secondary amino groups). The first part can further include any optional materials having reactive amine hydrogen groups. For example, the first part can include an optional polyamine adduct formed by reacting a polyamine such as a diamine with an epoxy resin, and an optional curing catalyst. Any other materials such as additives, fillers (organic and/or inorganic), and/or toughening agents can be included in the first part provided it does not react with the other materials of the first part. If the toughening agent has reactive amine hydrogen groups, it is typically present in the first part.

The second part includes the epoxy resin. The adhesive promoter can be included with the epoxy resin in the second part, can be applied directly to the substrate, or can be combined with the first and second part during or after their mixing. Any other material such as additives, fillers (organic and/or inorganic), and toughening agents can be included in the second part provided it does not react with the other materials in the second part.

In some embodiments, the curable compositions may be prepared by mixing the first part and separately mixing the second part. Both parts may be mixed using any conventional mixing technique, including using a high shear mixer. In embodiments in which inorganic fillers are included in the curable compositions, any optional dispersants are usually pre-mixed with the inorganic filler prior to incorporating into the composition. Next, the two parts may be mixed using any conventional mixing technique to form the curable composition.

The two parts can be delivered to the bonding site in any suitable manner. In some embodiments, the two parts are dispensed from separate chambers and mixed together. Thus, a dispenser is provided that contains at least two chambers. The first chamber contains the first part of the curable composition and the second chamber contains the second part of the curable composition. If desired, the various materials of the curable composition can be divided into more than two parts and the dispenser can have more than two chambers.

Cured Composition

The cured composition is the reaction product of the curable composition. In some embodiments, the curable compositions may be capable of curing without the use of catalyst or curing accelerator. In other embodiments, a catalyst or curing accelerator is added. The curable composition can be cured at room temperature or elevated temperatures (e.g., greater than 30° C.). For example, the curable compositions may cure at typical application conditions, such as at room temperature without the need for elevated temperatures or actinic radiation (e.g., ultraviolet light). For example, the curable composition cures at room temperature, or at temperatures no greater than 30° C. such as no greater than 25° C., no greater than 20° C., no greater than 15° C., or no greater than 10° C. If desired, an optional post-curing step at an elevated temperature can be used after curing at room temperature.

The curable composition can be provided as a two-part composition. The two parts may be mixed prior to being applied to a substrate. Applying the curable composition can be carried out, for example, by dispensing the curable composition from a dispenser comprising a first chamber, a second chamber, and a mixing tip. The first chamber comprises the first part, the second chamber comprises the second part, and the first and second chambers are coupled to the mixing tip to allow the first part and the second part to flow through the mixing tip. After mixing, the two-part composition undergoes a curing reaction to form a structural adhesive or a protective coating.

Articles

In some embodiments, the cured composition may function as a structural or semi-structural adhesive (i.e., the cured composition can bond a first substrate to a second substrate) after curing. Generally, the bond strength (e.g., peel strength, overlap shear strength, or impact strength) of a structural or semi-structural adhesive continues to build well after the initial cure time. Thus, an article is provided that comprises a first substrate, a second substrate and a cured composition disposed between and adhering (bonding) the first substrate to the second substrate, wherein the cured composition is the reaction product of the curable composition described above. The cured composition can bond the first substrate to the second substrate.

In other embodiments, the curable and cured composition may function as a coating. Thus, an article is provided that comprises a substrate (e.g., metal substrate with an outer surface of metal oxide) and a coating of the uncured, partially cured or fully cured curable composition on at least one surface thereof. If the substrate has two major surfaces, the coating can be coated on one or both major surfaces of the substrate. Other layers can be present such as, for example, bonding, tying, protective, and topcoat layers. The substrate is often a metal and the metal substrate can be, for example, at least one of the inner and outer surfaces of a pipe, vessel, conduit, rod, profile shaped article, sheet or tube.

Any suitable first substrate and second substrate can be used. The substrates are often selected to have groups available on the outer surface that can react with the silyl groups of the adhesion promoter. That is, the outer surface of the substrate often has hydroxy, hydroxide, or oxide groups on the surface that can react with the hydrolyzable silyl groups of the adhesion promoter. In some embodiments, the substrate is an inorganic material such as a metal, inorganic hydroxide, or inorganic oxide that can react with the hydrolyzable silyl groups. In other embodiments, the substrate is a polymeric material having hydroxyl groups that can react with the hydrolyzable silyl groups.

The substrate can be a metal, metal oxide, ceramic material, glass, polymeric material, or a composite material. In many embodiments, the substrate has an outer layer that is a metal oxide, ceramic material, or glass. Example substrates can be a metal (e.g., aluminum, steel, zinc, titanium, iron, chromium, nickel, and various alloys) or oxide thereof.

Any suitable thickness of the cured composition may be present in the articles. In some embodiments, the curable compositions used to form the cured compositions have a thickness ranging from 5 microns to 10,000 microns, 25 micrometers to 10,000 micrometers, 100 micrometers to 5,000 micrometers, or 250 micrometers to 1,000 micrometers.

When used as a structural adhesive, the cured compositions often can be subjected to higher loads prior to debonding compared to those lacking the adhesion promoter. The increase load can increase by at least 20 percent, at least 30 percent, at least 40 percent, or at least 50 percent compared to cured adhesives without the adhesion promoter.

The cured compositions often can be extended further prior to debonding compared to those lacking the adhesion promoter. This stronger adhesion to the substrate often results in the failure mode being cohesive rather than adhesive. Cohesive failure is typically preferred over adhesive failure. That is, failure often occurs in the structural adhesive itself (i.e., cohesive failure) prior to failure at the interface between the structural adhesive and the substrate (i.e., adhesive failure).

The improved performance of the cured composition is believed to be attributable to the bonds formed between the adhesion promoter and the substrate and between the adhesion promoter and the polymeric matrix of the structural adhesive.

Various embodiments are provided that include an adhesion promoter, a curable composition that includes the adhesion promoter, a cured composition formed from the curable composition, and an article that includes the cured composition.

Embodiment 1A is adhesion promoter that has at least one epoxide group and a plurality of hydrolyzable silyl groups. The adhesion promoter is a ring-opened adduct of 1) a polyepoxide comprising at least two epoxide groups, 2) an aminosilane, and 3) an isocyanato silane. The aminosilane is of Formula (I).

$$HN(R^1)(Z^1—Si(L^1)_x(L^2)_{3-x}) \qquad (I)$$

In Formula (I), group $R^1$ is hydrogen, alkyl, or a group of formula $—Z^1—Si(L^1)_x(L^2)_{3-x}$. Group $L^1$ is a hydrolyzable group and $L^2$ is an alkyl. The variable x is an integer equal to 1, 2, or 3. Group $Z^1$ is a divalent linking group having 1 to 12 carbon atoms. The isocyanato silane is of Formula (II).

$$O=C=N—Z^2—Si(L^3)_y(L^4)_{3-y} \qquad (II)$$

In Formula (II), $L^3$ is a hydrolyzable group and $L^4$ is an alkyl. The variable y is an integer equal to 1, 2, or 3. Group $Z^2$ is a divalent linking group having 1 to 12 carbon atoms.

Embodiment 2A is the adhesion promoter of embodiment 1A, wherein Formula (I) is of Formula (I-A)

$$HN(R^1)(Z^1—Si(L^1)_3) \qquad (I-A)$$

where $R^1$, $Z^1$, and $L^1$ are the same as defined in Formula (I).

Embodiment 3A is the adhesion promoter of embodiment 1A, wherein Formula (I) is of Formula (I-B)

$$HN(Z^1—Si(L^1)_x(L^2)_{3-x})_2 \qquad (I-B)$$

where $Z^1$, $L^1$, $L^2$, and x are the same as defined in Formula (I).

Embodiment 4A is the adhesion promoter of embodiment 3A, wherein Formula (I-B) is of Formula (I-C)

$$HN(Z^1—Si(L^1)_3)_2 \qquad (I-C)$$

where $Z^1$ and $L^1$ are the same as defined in Formulas (I) and (I-B).

Embodiment 5A is the adhesion promoter of any one of embodiments 1A to 4A, wherein $Z^1$ is an alkylene, heteroalkylene, arylene, or combination thereof.

Embodiment 6A is the adhesion promoter of any one of embodiments 1A to 5A, wherein $L^1$ is a halo, alkoxy, acyloxy, or aryloxy group.

Embodiment 7A is the adhesion promoter of embodiment 6A, wherein $L^1$ is alkoxy.

Embodiment 8A is the adhesion promoter of any one of embodiments 1A to 7A, wherein Formula (II) is of Formula (II-A)

    (II-A)

where $Z^2$ and $L^3$ are the same as defined in Formula (II).

Embodiment 9A is the adhesion promoter of any one of embodiments 1A to 8A, wherein $Z^2$ is an alkylene, heteroalkylene, arylene, or combination thereof.

Embodiment 10A is the adhesion promoter of any one of embodiments 1A to 9A, wherein $L^3$ is a halo, alkoxy, acyloxy, or aryloxy group.

Embodiment 11A is the adhesion promoter of embodiment 10A, wherein $L^3$ is alkoxy.

Embodiment 12A is the adhesion promoter of any one of embodiments 1A to 11A, wherein the adhesion promoter has at least one group of Formula (III)

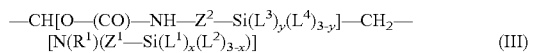    (III)

where groups R', $Z^1$, $Z^2$, $L^1$, $L^2$, $L^3$, $L^4$, x, and y are the same as defined in Formula (I) and Formula (II).

Embodiment 13A is the adhesion promoter of embodiment 12A, wherein Formula (III) is of Formula (III-A)

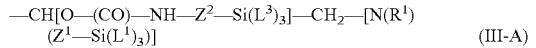    (III-A)

where groups $R^1$, $Z^1$, $Z^2$, $L^1$, and $L^3$ are the same as defined in Formula (I) and Formula (II).

Embodiment 14A is the adhesion promoter of any one of embodiments 1A to 13A, wherein the polyepoxide has 2 to 10, 2 to 6, or 2 to 4 epoxide groups per molecule.

Embodiment 1B is a curable composition. The curable composition contains a curable component comprising a) an adhesion promoter having at least one epoxide group and a plurality of hydrolyzable silyl groups, b) an epoxy resin having at least two epoxide groups, and c) a curing agent for the epoxy resin, the curing agent having at least two amino groups that are primary and/or secondary amino groups. The adhesion promoter is a ring-opened adduct of 1) a polyepoxide comprising at least two epoxide groups, 2) an aminosilane, and 3) an isocyanato silane. The aminosilane is of Formula (I).

    (I)

In Formula (I), group $R^1$ is hydrogen, alkyl, or a group of formula $-Z^1-Si(L^1)_x(L^2)_{3-x}$. Group $L^1$ is a hydrolyzable group and $L^2$ is an alkyl. The variable x is an integer equal to 1, 2, or 3. Group $Z^1$ is a divalent linking group having 1 to 12 carbon atoms. The isocyanato silane is of Formula (II).

    (II)

In Formula (II), $L^3$ is a hydrolyzable group and $L^4$ is an alkyl. The variable y is an integer equal to 1, 2, or 3. Group $Z^2$ is a divalent linking group having 1 to 12 carbon atoms.

Embodiment 2B is the curable composition of embodiment 1B, wherein the adhesion promoter is of any one of embodiments 2A to 14A.

Embodiment 3B is the curable composition of embodiment 1B or 2B, wherein the adhesion promoter is present in an amount in a range of 0.1 to 10 weight percent based on a total weight of the curable component (which is the curable composition minus any optional filler).

Embodiment 4B is the curable composition of any one of embodiments 1B to 3B, wherein the epoxy resin has at least two glycidyl groups and an epoxy equivalent weight in a range of 150 to 2000 grams per equivalent.

Embodiment 5B is the curable composition of any one of embodiments 1B to 4B, wherein the epoxy resin is present in an amount in a range of 40 to 80 weight percent based on a total weight of the curable component (which is the curable composition minus any optional filler).

Embodiment 6B is the curable composition of any one of embodiments 1B to 5B, wherein the curing agent comprises a compound of Formula (IV)

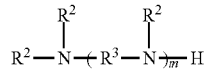    (IV)

where each $R^2$ group is independently hydrogen, alkyl, aryl, aralkyl, or alkaryl. Each $R^3$ is independently an alkylene, heteroalkylene, or combination thereof. The variable m is an integer in a range of 1 to 10.

Embodiment 7B is the curable composition of embodiment 6B, wherein $R^3$ is a heteroalkylene.

Embodiment 8B is the curable composition of any one of embodiments 1B to 7B, wherein the curing agent comprises 4,7,10-trioxatridecane-1,13-diamine.

Embodiment 9B is the curable composition of any one embodiments 1B to 8B, wherein the curing agent comprises an amino-containing adduct having at least two amino groups that are primary and/or secondary amino groups, the amino-containing adduct being a reaction product of an epoxy resin and a poly amine.

Embodiment 10B is the curable composition of embodiment 9B, wherein the amino-containing adduct is the reaction product of a diglycidyl epoxide and a polyamine of Formula (IV)

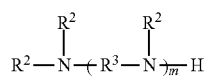    (IV)

where each $R^2$ group is independently hydrogen, alkyl, aryl, aralkyl, or alkaryl. Each $R^3$ is independently an alkylene, heteroalkylene, or combination thereof. The variable m is an integer in a range of 1 to 10.

Embodiment 11B is the curable composition of any one of embodiment 1B to 10B, wherein the curable composition contains 10 to 60 weight percent curing agent based on a total weight of the curable component (which is the curable composition minus any optional filler).

Embodiment 12B is the curable composition of any one of embodiments 1B to 11B, wherein the curable composition further comprises an optional curing catalyst.

Embodiment 13B is the curable composition of embodiment 12B, wherein the optional curing catalyst is of Formula (V)

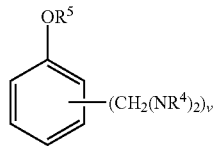

(V)

where each group $R^4$ is independently an alkyl, the variable v is an integer equal to 2 or 3, and the group $R^5$ is hydrogen or alkyl.

Embodiment 14B is the curable composition of embodiment 13B, wherein the optional curing catalyst is 2,4,6-(dimethylaminomethyl)phenol (i.e., tris(dimethylaminomethyl)phenol).

Embodiment 15B is the curable composition of any one of embodiments 12B to 14B, wherein the curing composition contains 0 to 10 weight percent of the optional curing catalyst.

Embodiment 16B is the curable composition of any one of embodiments 1B to 15B, wherein the curable composition further comprises an optional toughening agent.

Embodiment 17B is the curable composition of embodiment 16B, wherein the optional toughening agent comprises a core-shell rubber.

Embodiment 18B is the curable composition of embodiment 17B, wherein the curing composition contains 0 to 40 weight percent optional toughening agent based on a total weight of the curable component (which is the curing composition minus any optional filler).

Embodiment 19B is the curable composition of any one of embodiments 1B to 18B, wherein the moles of reactive amine hydrogens (—N—H groups) to moles of epoxide groups is in a range of 1.5:1 to 1:1.5.

Embodiment 20B is the curable composition of embodiment 19B, wherein the moles of reactive amine hydrogens (—N—H groups) to moles of epoxide groups is in a range of 1.2:1 to 1:1.2.

Embodiment 21B is the curable composition of embodiment 19B or 20B, the moles of reactive amine hydrogens (—N—H groups) to moles of epoxide groups is in a range of 1.1:1 to 1:1.1.

Embodiment 22B is the curable composition of any one of embodiments 1B to 21B, wherein the curable composition contains a curable component (which is the curable composition minus any optional filler) comprising 40 to 80 weight percent epoxy resin, 0.1 to 10 weight percent adhesion promoter, and 10 to 60 weight percent curing agent.

Embodiment 23B is the curable composition of embodiment 22B, wherein the curable component optionally further comprises 0 to 10 weight percent curing catalyst, 0 to 40 weight percent toughening agent, and 0 to 20 other optional additives.

Embodiment 24B is the curable composition of embodiment 22B, wherein the curable component comprises 40 to 70 weight percent epoxy resin, 0.5 to 10 weight percent adhesion promoter, and 20 to 60 weight percent curing agent or 45 to 70 weight percent epoxy resin, 0.5 to 5 weight percent adhesion promoter, and 25 to 55 weight percent curing agent.

Embodiment 25B is the curable composition of embodiment 24B, wherein the curable component optionally further comprises 0 to 10 weight percent curing catalyst, 0 to 40 weight percent toughening agent, and 0 to 20 other optional additives.

Embodiment 26B is the curable composition of any one of embodiments 1B to 25B, wherein the curable composition comprises 60 to 100 weight percent curable component and 0 to 40 weight percent inorganic filler.

Embodiment 27B is the curable composition of any one of embodiments 1B to 26B, wherein the curable composition is a multi-part composition and wherein materials in each part are selected so that no curing reaction occurs within that part.

Embodiment 28B is the curable composition of any one of embodiments 1B to 27B, wherein the curable composition is a two-part composition having a first part and a second part, the first part comprising the curing agent for the epoxy resin and the second part comprising the epoxy resin and the adhesion promoter.

Embodiment 1C is a cured composition. The cured composition comprises a cured reaction product of a curable composition of embodiment 1B.

Embodiment 2C is the cured composition of embodiment 1C, wherein the curable composition is any one of embodiments 2B to 28B.

Embodiment 3C is the cured composition of embodiment 1C or 2C, wherein the cured composition is a structural or semi-structural adhesive.

Embodiment 1D is an article that comprises a first substrate and a cured composition positioned adjacent to the first substrate, wherein the cured composition is of embodiment 1C.

Embodiment 2D is the article of embodiment 1D, wherein the cured composition is any one of embodiment 2C or 3C.

Embodiment 3D is the article of any one of embodiments 1D or 2D, the article further comprising a second substrate with the cured composition is positioned between the first substrate and the second substrate, the cured composition bonding the first substrate to the second substrate.

Embodiment 4D is the article of any one of embodiments 1D to 3D, wherein the cured composition is a structural adhesive or semi-structural adhesive.

Embodiment 5D is the article of any one of embodiments 1D to 4D, wherein the first substrate and/or the second substrate is selected to react with silyl groups of the adhesion promoter.

Embodiment 6D is the article of any one of embodiments 1D to 5D, wherein the first substrate and/or the second substrate has an outer surface containing a polymeric material with hydroxyl groups, an inorganic oxide, or an inorganic hydroxide.

Embodiment 7D is the article of any one of embodiments 1D to 6D, wherein the first substrate and/or the second substrate comprises a metal, metal oxide, ceramic material, glass, or a polymeric material with hydroxyl groups.

Embodiment 1E is a dispenser that comprises a first chamber and a second chamber. The first chamber comprises a curing agent for the epoxy resin, wherein the curing agent has at least two amino groups that are primary and/or secondary amino groups. The second chamber comprises an epoxy resin and an adhesion promoter having at least one epoxide group and a plurality of silyl groups. The adhesion promoter is a ring-opened adduct of 1) a polyepoxide comprising at least two epoxide groups, 2) an aminosilane, and 3) an isocyanato silane. The aminosilane is of Formula (I).

$$HN(R^1)(Z^1-Si(L^1)_x(L^2)_{3-x})$$ (I)

In Formula (I), group $R^1$ is hydrogen, alkyl, or a group of formula $-Z^1-Si(L^1)_x(L^2)_{3-x}$. Group $L^1$ is a hydrolyzable group and $L^2$ is an alkyl. The variable x is an integer equal to 1, 2, or 3. Group $Z^1$ is a divalent linking group having 1 to 12 carbon atoms. The isocyanato silane if of Formula (II).

$$O=C=N-Z^2-Si(L^3)_y(L^4)_{3-y} \quad (II)$$

In Formula (II), $L^3$ is a hydrolyzable group and $L^4$ is an alkyl. The variable y is an integer equal to 1, 2, or 3. Group $Z^2$ is a divalent linking group having 1 to 12 carbon atoms.

Embodiment 2E is the dispenser of embodiment 1E, wherein the adhesion promoter is any one of embodiments 1A to 14A.

Embodiment 3E is the dispenser of embodiment 1E or 2E, wherein the epoxy resin has at least two glycidyl groups and an epoxy equivalent weight in a range of 150 to 2000 grams per equivalent.

Embodiment 4E is the dispenser of any one of embodiments 1E to 3E, wherein the curing agent comprises a compound of Formula (IV)

(IV)

where each $R^2$ group is independently hydrogen, alkyl, aryl, aralkyl, or alkaryl. Each $R^3$ is independently an alkylene, heteroalkylene, or combination thereof. The variable m is an integer in a range of 1 to 10.

Embodiment 5E is the dispenser of embodiment 4E, wherein $R^3$ is a heteroalkylene.

Embodiment 6E is the dispenser of embodiment 4E or 5E, wherein the curing agent comprises 4,7,10-trioxatridecane-1,13-diaminer.

Embodiment 7E is the dispenser of any one of embodiments 1E to 6E, wherein the curing agent comprises an amino-containing adduct having at least two amino groups that are primary and/or secondary amino groups, the amino-containing adduct being a reaction product of an epoxy resin and a polyamine.

Embodiment 8E is the dispenser of embodiment 7E, wherein the amino-containing adduct is the reaction product of a diglycidyl epoxide and a polyamine of Formula (IV)

(IV)

where each $R^2$ group is independently hydrogen, alkyl, aryl, aralkyl, or alkaryl. Each $R^3$ is independently an alkylene, heteroalkylene, or combination thereof. The variable m is an integer in a range of 1 to 10.

Embodiment 9E is the dispenser of any one of embodiments 1E to 8E, wherein the first chamber further comprises an optional curing catalyst.

Embodiment 10E is the dispenser of embodiment 9E, wherein the optional curing catalyst is of Formula (V)

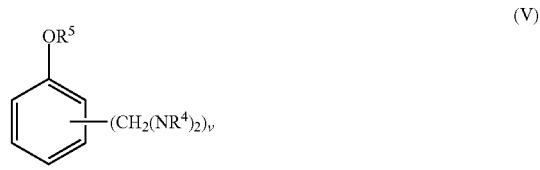

(V)

where each group $R^4$ is independently an alkyl, the variable v is an integer equal to 2 or 3, and the group $R^5$ is hydrogen or alkyl.

Embodiment 11E is the dispenser of embodiment 10E, wherein the optional curing catalyst is 2,4,6-(dimethylaminomethyl)phenol (i.e., tris(dimethylaminomethyl)phenol).

Embodiment 12E is the dispenser of any one of embodiments 1E to 11E, wherein the first chamber and/or the second chamber further comprises an optional toughening agent.

Embodiment 13E is the dispenser of embodiment 12E, wherein the optional toughening agent comprises a core-shell rubber.

Embodiment 14E is the dispenser of any one of embodiments 1E to 13E, wherein the moles of reactive amine hydrogens (—N—H groups) in the first chamber to moles of epoxide groups in the second chamber is in a range of 1.5:1 to 1:1.5.

Embodiment 15E is the dispenser of embodiment 14E, wherein the moles of reactive amine hydrogens (—N—H groups) to moles of epoxide groups is in a range of 1.2:1 to 1:1.2.

Embodiment 16E is the dispenser of embodiment 14E or 15E, wherein the moles of reactive amine hydrogens (—N—H groups) to moles of epoxide groups is in a range of 1.1:1 to 1:1.1.

EXAMPLES

Unless otherwise noted, all parts, percentages, ratios, etc. in the Examples and the rest of the specification are by weight. Unless otherwise indicated, all other reagents were obtained, or are available from fine chemical vendors such as Sigma-Aldrich Company, St. Louis, Mo., USA, or may be synthesized by known methods. Table 1 (below) lists materials used in the examples and their sources. The following abbreviations are used in this section: L=liter, mL=milliliter, sec=seconds, min=minutes, h=hours, g=gram, kg=kilograms, mol=mole, mmol=millimole, ° C.=degrees Celsius, cm=centimeters, µm=micrometers, and rpm=revolutions per minute.

TABLE 1

| Materials List | | |
|---|---|---|
| DESIGNATION | DESCRIPTION | SOURCE |
| (3-Glycidyloxypropyl) trimethoxysilane | Epoxy silane | Gelest, Morrisville. PA, USA |
| (3-Aminopropyl) trimethoxysilane | Amino silane | Gelest |
| N,N-Diglycidyl-4-glycidyloxyaniline | Polyepoxide | Sigma-Aldrich, St. Louis, MO, USA |

TABLE 1-continued

Materials List

| DESIGNATION | DESCRIPTION | SOURCE |
| --- | --- | --- |
| 4,4'-Methylenebis(N,N-diglycidylaniline) | Polyepoxide | Sigma-Aldrich |
| Bis[3-(triethoxysilyl)propyl] amine or bis(triethoxysilylpropyl)amine | Aminosilane obtained under the trade designation DYNASLAN 1122 | Evonik, Parsippany, NJ, USA |
| N-(3-(Trimethoxysilyl)propyl)butylamine | Aminosilane obtained under the trade designation DYNASLAN 1189 | Evonik |
| 3-(Triethoxysilyl)propyl isocyanate | Isocyanato silane | Sigma-Aldrich |
| Di-n-butyltin dilaurate | Catalyst for urethane formation | Alfa Aesar, Haverhill, MA, USA |
| Toluene | Organic solvent | Sigma-Aldrich |
| IPA | Isopropyl alcohol (organic solvent) | Sigma-Aldrich |
| Cold Rolled Steel (CRS) Coupon | Coupons with dimensions: 4.687 inches × 1.0 inch × 0.036 inches (11.9 cm × 2.54 cm × 0.09 cm) used for measurement of T-peel | Prepared from material obtained from ACT Test Panels, Hillsdale, MI, USA |
| Polyamine adduct composition | Curing agent that is a polyamine adduct formed from TTD diamine and MX-154 as described further below | 3M Company, Maplewood, MN, USA |
| TTD | 4,7,10-Trioxatridecane-1,13-diamine, a curing agent for epoxy resin (diamine with two primary amino groups) | BASF, Florham Park, NJ, USA |
| VEH30 | Tris(dimethylaminomethyl)phenol, a tertiary amine curing accelerator obtained under the trade designation VERSAMID EH 30 | Gabriel Phenoxies, Rock Hill, SC, USA |
| E828 | Epoxy resin obtained under the trade designation EPON 828 | Nexeo, The Woodlands, TX, USA |
| MX-154 | A composition that has an equivalent weight of 300 equivalents/gram that contains 40 weight percent polybutadiene core-shell rubber particles (toughening agent) and 60 weight percent bisphenol A epoxy resin; obtained under the trade designation KANE ACE MX-154 | Kaneka, Pasadena, TX, USA |
| Glass beads | Acid washed, 212-300 micrometer diameter | Sigma-Aldrich |
| VESTAMIN | 4,4'-diaminodicyclohexylmethane, a curing agent for epoxy resin (diamine with two primary amino groups) obtained under the trade designation VESTAMIN PACM | Evonik |
| GY285 | Epoxy resin obtained under the trade designation ARALDITE GY285 | Huntsman, Woodlands, TX, USA |
| Silica Filler | Fused Silica Grain with average diameter of 850 micrometer | 3M Company (Ceradyne) |

Test Methods

T-Peel Test Panel Surface Preparation

Cold rolled steel (CRS) coupons were cleaned with IPA soaked paper towels to remove contaminants on the surface and were thoroughly dried. The IPA cleaned panels were then abraded using 3M SCOTCH-BRITE ROLOC surface conditioning discs (CRS grade, product ID 07480; 3M Company, Maplewood, Minn., USA) to remove any rust and/or oxide layers on the panel surface. The abraded panels were subsequently cleaned with IPA soaked paper towel to remove excess debris.

T-Peel Test Coupon Preparation

Using a glass rod, an adhesive formulation was applied evenly to the surface of a pre-cleaned/abraded CRS coupon. On top of the adhesive, another pre-cleaned/abraded coupon was placed to make a completed T-peel sample construction. This mating process was held in place by small binder clips (6 clips each per sample with each clip being 0.75 inches wide). The samples were cured at room temperature for 5 days before conducting the T-peel tests.

T-Peel Measurement Test Method

T-peel tests were conducted according to ASTM D1876-08 (2015). A crosshead speed of 2 inches/min (5.08 cm/min) was used for measuring T-peel strength. The maximum extension data was also recorded. For each formulation, 5 samples were prepared and tested. Individual test sample averages, as well as an average of the 5 sample averages, for load and maximum extension are reported in Tables 3 and 4.

Adhesion Promoter Synthesis

Adhesion Promoter A

To a 100 mL 3-neck round bottom flask, 6.90 g of N,N-Diglycidyl-4-glycidyloxyaniline, 10.61 g of bis(triethoxysilylpropyl) amine, and 17.50 g of toluene were added. The mixture was then continuously stirred for at least 24 hours at 70° C. under a nitrogen atmosphere to complete the reaction. The resulting solution was transferred to a 250 mL 1-neck round bottom flask and 6.16 g of 3-(triethoxysilyl)propyl isocyanate and 0.03 g of di-n-butyltin dilaurate were added. The mixture was put on a rotary evaporator to remove the volatile solvent from the reaction. Typical water bath temperature to accelerate the solvent removal was 50° C. and the highest vacuum level was less than 10 torr. After the evaporation, the resulting product was a slightly viscous yellow liquid with a minimum solid percent of 98 weight percent.

Adhesion Promoter B

To a 100 mL 3-neck round bottom flask, 9.47 g of N,N-Diglycidyl-4-glycidyloxyaniline, 8.03 g of N-(3-(trimethoxysilyl)propyl)butylamine, and 17.50 g of toluene were added. The mixture was then continuously stirred for at least 24 hours at 70° C. under a nitrogen atmosphere to complete the reaction. The resulting solution was transferred to a 250 mL 1-neck round bottom flask and 8.44 g of 3-(triethoxysilyl)propyl isocyanate and 0.03 g of di-n-butyl-tin dilaurate were added. The mixture was put on a rotary evaporator to remove the volatile solvent from the reaction. Typical water bath temperature to accelerate the solvent removal was 50° C. and the highest vacuum level was less than 10 torr. After the evaporation, the resulting product was a slightly viscous yellow liquid with a minimum solid percent of 98 weight percent.

Adhesion Promoter C

To a 100 mL 3-neck round bottom flask, 8.68 g of 4,4'-Methylenebis(N,N-diglycidylaniline), 8.82 g of bis(tri-ethoxysilylpropyl) amine, and 17.50 g of toluene were added. The mixture was then continuously stirred for at least 24 hours at 70° C. under a nitrogen atmosphere to complete the reaction. The resulting solution was transferred to a 250 mL 1-neck round bottom flask and 5.12 g of 3-(triethoxy silyl)propyl isocyanate and 0.03 g of di-n-butyltin dilaurate were added. The mixture was put on a rotary evaporator to remove the volatile solvent from the reaction. Typical water bath temperature to accelerate the solvent removal was 50° C. and the highest vacuum level was less than 10 torr. After the evaporation, the resulting product was a slightly viscous yellow liquid with a minimum solid percent of 98 weight percent.

Adhesion Promoter D

To a 100 mL 3-neck round bottom flask, 11.24 g of 4,4'-Methylenebis(N,N-diglycidylaniline), 6.27 g of N-(3-(trimethoxysilyl)propyl)butylamine, and 17.50 g of toluene were added. The mixture was then continuously mixed for at least 24 hours at 70° C. under a nitrogen atmosphere to complete the reaction. The resulting solution was transferred to a 250 mL 1-neck round bottom flask and 6.58 g of 3-(triethoxysilyl)propyl isocyanate and 0.03 g of di-n-butyl-tin dilaurate were added. The mixture was put on a rotary evaporator to remove the volatile solvent from the reaction. Typical water bath temperature to accelerate the solvent removal was 50° C. and the highest vacuum level was less than 10 torr. After the evaporation, the resulting product was a slightly viscous yellow liquid with a minimum solid percent of 98 weight percent.

Polyamine Adduct Composition

To a 151.4 L Ross 3 shaft mixer kettle, 36.29 kg TTD diamine was added, followed by 20.87 kg MX-154 (containing epoxy resin and polybutadiene core-shell rubber particles) at a temperature of between 26.7 to 37.7° C., and mixed under nitrogen with the anchor blade at 35 rpm and shear blade at 700 rpm for 30 minutes. The ratio of moles of amine hydrogen (i.e., moles of reactive amine hydrogen) to moles of epoxide groups in the mixture was 6:1. The mixture was then heated to 65.6° C., and the mixture was allowed to reach its peak exotherm, approximately 87.8° C., after which the mixing continued for an additional 10 minutes. The mixture was then cooled to 48.9° C. and an additional 12.52 kg of MX-154 at 26.7 to 37.7° C. was added and mixed under nitrogen for 30 minutes. The mixture was then heated to 65.6° C. and allowed to exotherm a second time, with an additional 10 minutes of mixing after the peak temperature of the exotherm was reached. The material was then transferred into containers and sealed. The polyamine adduct composition contains the poly amine adduct of the epoxy resin, toughening agent, and residual diamine.

Control Examples A-E and Examples 1-6

For each sample, a Part A composition was prepared and a separate Part B composition was prepared. These two parts were then mixed to form the adhesive composition.

Part A Preparation

To a 150 mL speed mixer container, 79.77 g of polyamine adduct composition, 17.23 g of 4,7,10-trioxatridecane-1,13-diamine, and 3.00 g of VEH30 were added. The container was closed with a lid and was placed in a DAC 150 speed mixer (FlackTek, Inc., Landrum, S.C., USA). The contents were mixed at 2000 rpm for 4 min. The resulting mixture was slightly yellow opaque viscous liquid. The reactive amine hydrogen equivalent weight was 106 grams/equivalent.

Part B Preparation

To a 150 mL speed mixer container, 55.87 g of E828 and 44.13 g of MX-154 were added. The container was closed with a lid and was placed in a DAC 150 speed mixer. The contents were mixed at 2000 rpm for 4 min. The resulting mixture was opaque viscous liquid. The epoxy equivalent weight was 224 grams/equivalent.

Curable Composition Preparation: Controls A-C and Examples 1-4

To a 150 mL speed mixer container, 30.00 g of the premixed part A, 63.24 g of the premixed part B, and 1.4 g of glass beads were added. The ratio of equivalents of reactive amine hydrogen to equivalents of epoxide groups was 1:1. Adhesion promoters were added to the container as appropriate according to Table 2. The container was closed with a lid and was placed in a DAC 150 speed mixer. Then the contents were mixed at 2000 rpm for 4 minutes.

The resulting mixture was used for making T-peel test coupons. T-peel test data is reported in Tables 3 (average load) and 4 (maximum extension).

TABLE 2

Formulations of curable compositions Controls A-C and Examples 1-4

| | PART A grams | PART B grams | GLASS BEADS grams | ADHESION PROMOTER | ADHESION PROMOTER, grams |
|---|---|---|---|---|---|
| Control A | 30.00 | 63.24 | 1.4 | None | — |
| Control B | 30.00 | 63.24 | 1.4 | (3-Glycidyloxy-propyl) trimethoxysilane | 0.93 |
| Control C | 30.00 | 63.24 | 1.4 | (3-Aminopropyl) trimethoxysilane | 0.93 |
| Example 1 | 30.00 | 63.24 | 1.4 | Adhesion promoter A | 0.93 |
| Example 2 | 30.00 | 63.24 | 1.4 | Adhesion promoter B | 0.93 |
| Example 3 | 30.00 | 63.24 | 1.4 | Adhesion promoter C | 0.93 |
| Example 4 | 30.00 | 63.24 | 1.4 | Adhesion promoter D | 0.93 |

TABLE 3

Average Load for Controls A-C and Examples 1-4

| SAMPLE # | | AVERAGE LOAD, N/inch (N/mm) | AVERAGED AVERAGE LOAD, N/inch (N/mm) | % IMPROVEMENT (COMPARED TO CONTROL A) |
|---|---|---|---|---|
| Control A | 1 | 73 (3) | 71 +/− 11 | — |
| | 2 | 81 (3) | (3 +/− 0.4) | |
| | 3 | 80 (3) | | |
| | 3 | 54 (2) | | |
| | 4 | 67 (3) | | |
| Control B | 1 | 79 (3) | 78 +/− 8 | 10 |
| | 2 | 89 (4) | (3 +/− 0.3) | |
| | 3 | 76 (3) | | |
| | 4 | 80 (3) | | |
| | 5 | 66 (3) | | |
| Control C | 1 | 70 (3) | 83 +/− 14 | 17 |
| | 2 | 88 (3) | (3 +/− 0.5) | |
| | 3 | 67 (3) | | |
| | 4 | 93 (4) | | |
| | 5 | 97 (4) | | |
| Example 1 | 1 | 114 (4) | 111 +/− 6 | 56 |
| | 2 | 107 (4) | (4 +/− 0.2) | |
| | 3 | 108 (4) | | |
| | 4 | 121 (5) | | |
| | 5 | 106 (4) | | |
| Example 2 | 1 | 86 (3) | 115 +/− 20 | 62 |
| | 2 | 126 (5) | (5 +/− 0.8) | |
| | 3 | 124 (5) | | |
| | 4 | 105 (4) | | |
| | 5 | 135 (5) | | |
| Example 3 | 1 | 101 (4) | 105 +/− 10 | 48 |
| | 2 | 101 (4) | (4 +/− 0.4) | |
| | 3 | 122 (5) | | |
| | 4 | 101 (4) | | |
| | 5 | 100 (4) | | |
| Example 4 | 1 | 87 (3) | 104 +/− 22 | 46 |
| | 2 | 106 (4) | (4 +/− 0.9) | |
| | 3 | 86 (3) | | |
| | 4 | 101 (4) | | |
| | 5 | 140 (6) | | |

TABLE 4

Maximum Extension for Controls A-C and Examples 1-4

| SAMPLE # | | MAXIMUM EXTENSION, mm | AVERAGED MAXIMUM EXTENSION, mm | % IMPROVEMENT (COMPARED TO CONTROL A) |
|---|---|---|---|---|
| Control A | 1 | 50.1 | 51.1 +/− 17.2 | — |
| | 2 | 73.9 | | |
| | 3 | 56.8 | | |
| | 4 | 26.2 | | |
| | 5 | 48.5 | | |
| Control B | 1 | 52.3 | 48.6 +/− 15.8 | −5 |
| | 2 | 67.9 | | |
| | 3 | 42.1 | | |
| | 4 | 55.2 | | |
| | 5 | 25.6 | | |
| Control C | 1 | 55.5 | 79.7 +/− 14.9 | 56 |
| | 2 | 81.6 | | |
| | 3 | 88.8 | | |
| | 4 | 94.3 | | |
| | 5 | 78.1 | | |
| Example 1 | 1 | 118.5 | 128.7 +/− 20.3 | 152 |
| | 2 | 137.5 | | |
| | 3 | 148.0 | | |
| | 4 | 141.3 | | |
| | 5 | 98.0 | | |
| Example 2 | 1 | 79.4 | 115.7 +/− 22.2 | 126 |
| | 2 | 136.7 | | |
| | 3 | 124.5 | | |
| | 4 | 111.3 | | |
| | 5 | 126.7 | | |
| Example 3 | 1 | 100.4 | 96.2 +/− 7.0 | 88 |
| | 2 | 102.3 | | |
| | 3 | 100.8 | | |
| | 4 | 90.9 | | |
| | 5 | 86.6 | | |
| Example 4 | 1 | 96.1 | 114.4 +/− 15.2 | 124 |
| | 2 | 124.0 | | |
| | 3 | 99.5 | | |
| | 4 | 125.9 | | |
| | 5 | 126.6 | | |

Curable Composition Preparation: Control D and Example 5

To a 150 mL speed mixer container, 36.00 g of the premixed part A, 63.24 g of the premixed part B, and 1.49 g of glass beads were added. The ratio of equivalents of reactive amine hydrogen to equivalents of epoxide groups was 1.2:1. Adhesion promoters were added to the container as appropriate according to Table 5. The container was closed with a lid and was placed in a DAC 150 speed mixer. Then the contents were mixed at 2000 rpm for 4 minutes.

The resulting mixture was used for making T-peel test coupons. T-peel test data is reported in Tables 6 (average load) and 7 (maximum extension).

Curable Composition Preparation: Control E and Example 6

To a 150 mL speed mixer container, 30.00 g of the premixed part A, 75.89 g of the premixed part B, and 1.59 g of glass beads were added. The ratio of equivalents of reactive amine hydrogen to equivalents of epoxide groups was 1:1.2. Adhesion promoters were added to the container as appropriate according to Table 5. The container was closed with a lid and was placed in a DAC 150 speed mixer. Then the contents were mixed at 2000 rpm for 4 minutes.

The resulting mixture was used for making T-peel test coupons. T-peel test data is reported in Tables 6 (average load) and 7 (maximum extension).

TABLE 5

Formulations of curable compositions for Controls D-E and Examples 5-6

| | PART A, grams | PART B, grams | GLASS BEADS, grams | ADHESION PROMOTER | ADHESION PROMOTER, grams |
|---|---|---|---|---|---|
| Control D | 36.00 | 63.24 | 1.49 | None | — |
| Control E | 30.00 | 75.89 | 1.59 | None | — |
| Example 5 | 36.00 | 63.24 | 1.49 | Adhesion promoter A | 0.99 |
| Example 6 | 30.00 | 75.89 | 1.59 | Adhesion promoter A | 1.06 |

TABLE 6

Average Load for Controls D-E and Examples 5-6

| SAMPLE # | | AVERAGE LOAD, N/inch (N/mm) | AVERAGED AVERAGE LOAD, N/inch (N/mm) | % IMPROVEMENT (COMPARED TO CONTROLS) |
|---|---|---|---|---|
| Control D | 1 | 104 (4) | 112 +/− 25 | — |
|  | 2 | 140 (6) | (4 +/− 1) |  |
|  | 3 | 92 (4) |  |  |
| Control E | 1 | 98 (4) | 102 +/− 10 | — |
|  | 2 | 114 (5) | (4 +/− 0.4) |  |
|  | 3 | 95 (4) |  |  |
| Example 5 | 1 | 119 (5) | 138 +/− 16 | 23 |
|  | 2 | 150 (6) | (5 +/− 0.7) | (Compare to |
|  | 3 | 147 (6) |  | Control D) |
| Example 6 | 1 | 133 (5) | 125 +/− 10 | 23 |
|  | 2 | 126 (5) | (5 +/− 0.4) | (Compare to |
|  | 3 | 114 (5) |  | Control E) |

TABLE 7

Maximum Extension for Controls D-E and Examples 5-6

| SAMPLE # | | MAXIMUM EXTENSION, mm | AVERAGED MAXIMUM EXTENSION, mm | % IMPROVEMENT (COMPARED TO CONTROLS) |
|---|---|---|---|---|
| Control D | 1 | 132.2 | 126.5 +/− 12.6 | — |
|  | 2 | 135.2 |  |  |
|  | 3 | 112.0 |  |  |
| Control E | 1 | 124.0 | 115.2 +/− 15.4 | — |
|  | 2 | 124.3 |  |  |
|  | 3 | 97.5 |  |  |
| Example 5 | 1 | 124.1 | 133.8 +/− 8.5 | 6 |
|  | 2 | 139.6 |  | (Compare to |
|  | 3 | 137.8 |  | Control D) |
| Example 6 | 1 | 139.8 | 131.0 +/− 7.8 | 14 |
|  | 2 | 125.1 |  | (Compare to |
|  | 3 | 128.1 |  | Control E) |

Control F and Example 7

For each sample, a Part C composition was prepared and a separate Part D composition was prepared. These two parts were then mixed to form the adhesive composition.

Part C Preparation

To a 150 mL speed mixer container, 79.77 g of polyamine adduct composition, 17.23 g of VESTAMINE, and 3.00 g of VEH30 were added. The container was closed with a lid and was placed in a DAC 150 speed mixer (FlackTek, Inc., Landrum, S.C., USA). The contents were mixed at 2000 rpm for 4 min. The resulting mixture was slightly yellow opaque viscous liquid. The reactive amine hydrogen equivalent weight was 106 grams/equivalent.

Part D Preparation

To a 150 mL speed mixer container, 44.47 g of GY285, 39.55 g of MX-154, and 15.98 g of silica filler were added. The container was closed with a lid and was placed in a DAC 150 speed mixer. The contents were mixed at 2000 rpm for 4 min. The resulting mixture was opaque viscous liquid. The epoxy equivalent weight was 250 grams/equivalent.

Curable Composition Preparation: Control F and Example 7

To a 150 mL speed mixer container, 30.00 g of the premixed part C, 70.59 g of the premixed part D, and 1.32 g of glass beads were added. The ratio of equivalents of reactive amine hydrogen to equivalents of epoxide groups was 1:1. Adhesion promoters were added to the container as appropriate according to Table 8. The container was closed with a lid and was placed in a DAC 150 speed mixer. Then the contents were mixed at 2000 rpm for 4 minutes.

The resulting mixture was used for making T-peel test coupons. T-peel test data is reported in Tables 9 (average load) and 10 (maximum extension).

TABLE 8

Formulations of curable compositions

| | PART C, grams | PART D, grams | GLASS BEADS, grams | ADHESION PROMOTER | ADHESION PROMOTER, grams |
|---|---|---|---|---|---|
| Control F | 30.00 | 70.59 | 1.32 | None | — |
| Example 7 | 30.00 | 70.59 | 1.32 | Adhesion promoter A | 0.22 |

TABLE 9

Average Load

| SAMPLE # | | AVERAGE LOAD, N/inch (N/mm) | AVERAGED AVERAGE LOAD, N/inch (N/mm) | % IMPROVEMENT (COMPARED TO CONTROL F) |
|---|---|---|---|---|
| Control F | 1 | 135 (5) | 146 +/− 14 | — |
|  | 2 | 141 (6) | (5.7 +/− 0.5) |  |
|  | 3 | 161 (6) |  |  |
| Example 7 | 1 | 167 (7) | 167 +/− 1 | 15 |
|  | 2 | 169 (7) | (6.6 +/− 0.1) |  |
|  | 3 | 166 (7) |  |  |

TABLE 10

Maximum Extension

| SAMPLE # | | MAXIMUM EXTENSION, mm | AVERAGED MAXIMUM EXTENSION, mm | % IMPROVEMENT (COMPARED TO CONTROL F) |
|---|---|---|---|---|
| Control F | 1 | 125.2 | 134.5 +/− 8.1 | — |
|  | 2 | 138.0 |  |  |
|  | 3 | 140.2 |  |  |
| Example 7 | 1 | 142.0 | 142.1 +/− 1.7 | 6 |
|  | 2 | 143.8 |  |  |
|  | 3 | 140.5 |  |  |

What is claimed is:

1. An adhesion promoter having at least one epoxide group and a plurality of hydrolyzable silyl groups, the adhesion promoter being a ring-opened adduct of
   a) a polyepoxide comprising at least three epoxide groups;
   b) an aminosilane of Formula (I)

$$HN(R^1)(Z^1-Si(L^1)_x(L^2)_{3-x}) \quad (I)$$

wherein
   $R^1$ is alkyl, or a group of formula $-Z^1-Si(L^1)_x(L^2)_{3-x}$;
   $L^1$ is a hydrolyzable group;
   $L^2$ is an alkyl;
   x is an integer equal to 1, 2, or 3;
   $Z^1$ is a divalent linking group having 1 to 12 carbon atoms; and
   c) an isocyanato silane of Formula (II)

$$O=C=N-Z^2-Si(L^3)_y(L^4)_{3-y} \quad (II)$$

wherein
$L^3$ is a hydrolyzable group;
$L^4$ is an alkyl;
y is an integer equal to 1, 2, or 3;
$Z^2$ is a divalent linking group having 1 to 12 carbon atoms.

2. The adhesion promoter of claim 1, wherein the adhesion promoter has at least one group of Formula (III)

—CH[O—(CO)—NH—$Z^2$—Si($L^3$)$_y$($L^4$)$_{3-y}$]—CH$_2$—N($R^1$)($Z^1$—Si($L^1$)$_x$($L^2$)$_{3-x}$)     (III)

where groups $R^1$, $Z^1$, $Z^2$, $L^1$, $L^2$, $L^3$, $L^4$, x, and y are the same as defined in Formula (I) and Formula (II).

3. The adhesion promoter of claim 2, wherein Formula (III) is of Formula (III-A)

—CH[O—(CO)—NH—$Z^2$—Si($L^3$)$_3$]—CH$_2$—N($R^1$)($Z^1$—Si($L^1$)$_3$)     (III-A)

where groups $R^1$, $Z^1$, $Z^2$, $L^1$, and $L^3$ are the same as defined in Formula (III).

4. A curable composition comprising:
a curable component comprising
   an adhesion promoter having at least one epoxide group and a plurality of silyl groups, the adhesion promoter being a ring-opened adduct of
   a) a polyepoxide comprising at least two three epoxide groups;
   b) an aminosilane of Formula (I)

HN($R^1$)($Z^1$—Si($L^1$)$_x$($L^2$)$_{3-x}$)     (I)

wherein
     $R^1$ is alkyl, or a group of formula —$Z^1$—Si($L^1$)$_x$($L^2$)$_{3-x}$;
     $L^1$ is a hydrolyzable group;
     $L^2$ is an alkyl;
     x is an integer equal to 1, 2, or 3;
     $Z^1$ is a divalent linking group having 1 to 12 carbon atoms;
   c) an isocyanato silane of Formula (II)

O=C=N—$Z^2$—Si($L^3$)$_y$($L^4$)$_{3-y}$     (II)

wherein
     $L^3$ is a hydrolyzable group;
     $L^4$ is an alkyl;
     y is an integer equal to 1, 2, or 3; and
     $Z^2$ is a divalent linking group having 1 to 12 carbon atoms;
an epoxy resin having at least two epoxide groups; and
a curing agent for the epoxy resin, the curing agent having at least two amino groups that are primary and/or secondary amino groups.

5. The curable composition of claim 4, wherein the curable composition comprises a first part and a second part with the curing agent being in the first part and the adhesion promoter and the epoxy resin being in the second part.

6. The curable composition of claim 4, wherein moles of reactive amine hydrogens (—N—H groups) to moles of epoxide groups is in a range of 1.5:1 to 1:1.5.

7. The curable composition of claim 4, wherein the curable component comprises up to 80 weight percent epoxy resin, 0.1 to 10 weight percent adhesion promoter, and up to 60 weight percent curing agent.

8. The curable composition of claim 4, wherein the curable composition comprises 60 to 100 weight percent curable component and 0 to 40 weight percent inorganic filler.

9. A cured composition comprising a cured reaction product of the curable composition of claim 4.

10. An article comprising a first substrate and the cured composition of claim 9 positioned adjacent to the first substrate.

11. The article of claim 10, further comprising a second substrate and wherein the cured composition is positioned between the first substrate and the second substrate.

12. The article of claim 10, wherein the first substrate and/or the second substrate has groups that react with the hydrolyzable silyl groups of the adhesion promoter to form a covalent bond bonding the adhesion promoter to the first substrate and/or to the second substrate.

13. A dispenser comprising a first chamber and a second chamber,
the first chamber comprising a curing agent for an epoxy resin having at last two epoxide groups, the curing agent having at least two amino groups that are primary and/or secondary amino groups; and
the second chamber comprising the epoxy resin having at least two epoxide groups and an adhesion promoter having at least one epoxide group and a plurality of silyl groups, the adhesion promoter being a ring opened adduct of
1) a polyepoxide comprising at least three epoxide groups;
2) an aminosilane of Formula (I)

HN($R^1$)($Z^1$—Si($L^1$)$_x$($L^2$)$_{3-x}$)     (I)

wherein
     $R^1$ is alkyl, or a group of formula —$Z^1$—Si($L^1$)$_x$($L^2$)$_{3-x}$;
     $L^1$ is a hydrolyzable group;
     $L^2$ is an alkyl;
     x is an integer equal to 1, 2, or 3; and
     $Z^1$ is a divalent linking group having 1 to 12 carbon atoms;
3) an isocyanato silane of Formula (II)

O=C=N—$Z^2$—Si($L^3$)$_y$($L^4$)$_{3-y}$     (II)

wherein
     $L^3$ is a hydrolyzable group;
     $L^4$ is an alkyl;
     y is an integer equal to 1, 2, or 3; and
     $Z^2$ is a divalent linking group having 1 to 12 carbon atoms.

* * * * *

UNITED STATES PATENT AND TRADEMARK OFFICE
CERTIFICATE OF CORRECTION

PATENT NO. : 11,168,237 B2
APPLICATION NO. : 17/250156
DATED : November 9, 2021
INVENTOR(S) : Harry Lee Page 1 of 1

It is certified that error appears in the above-identified patent and that said Letters Patent is hereby corrected as shown below:

In the Claims

<u>Column 37</u>
Line 25, In Claim 4, after "at least", delete "two".

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*